United States Patent
Ohta et al.

(10) Patent No.: US 7,028,570 B2
(45) Date of Patent: Apr. 18, 2006

(54) TRANSMISSION

(75) Inventors: Yoshitaka Ohta, Wako (JP); Fumiyoshi Kanbara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 110 days.

(21) Appl. No.: 10/733,422

(22) Filed: Dec. 11, 2003

(65) Prior Publication Data
US 2004/0139814 A1    Jul. 22, 2004

(30) Foreign Application Priority Data
Jan. 21, 2003    (JP)    ............................. 2003-012897
Jun. 12, 2003    (JP)    ............................. 2003-168135

(51) Int. Cl.
*F16H 3/08*    (2006.01)

(52) U.S. Cl. ............................. 74/340; 74/355; 74/373; 74/375

(58) Field of Classification Search .................. 74/325, 74/329, 331, 333, 335, 336 B, 339, 340, 74/342, 343, 355, 373, 374, 375
See application file for complete search history.

(56) References Cited

U.S. PATENT DOCUMENTS

| | | | | | |
|---|---|---|---|---|---|
| 2,718,797 | A | * | 9/1955 | Gravina ....................... | 475/262 |
| 2,939,328 | A | * | 6/1960 | Sinclair ....................... | 74/339 |
| 4,727,768 | A | * | 3/1988 | Hayashi et al. ............. | 475/206 |
| 4,827,783 | A | * | 5/1989 | Yamaoka et al. ............ | 74/371 |
| 4,932,278 | A | * | 6/1990 | Nemoto ....................... | 74/371 |
| 5,109,722 | A | * | 5/1992 | Hufnagle et al. ............ | 74/371 |
| 5,211,067 | A | * | 5/1993 | von Kaler .................... | 74/371 |
| 5,592,855 | A | | 1/1997 | Weirich et al. ............... | 74/371 |

FOREIGN PATENT DOCUMENTS

| | | | |
|---|---|---|---|
| AU | 412308 | 4/1971 | |
| JP | 60-69330 | * 4/1985 | .................. 74/340 |
| JP | 6043561 | 11/1994 | |

\* cited by examiner

*Primary Examiner*—Ha Ho
(74) *Attorney, Agent, or Firm*—Adams & Wilks

(57) ABSTRACT

A transmission for a working machine including a drive transmission mechanism and a working transmission mechanism operated by swinging a shift lever is provided. The drive transmission mechanism has a key-sliding transmission mechanism axially mounted on a drive shaft. The key-sliding transmission mechanism causes a selected one of a plurality of gears rotatably mounted on the drive shaft and the drive shaft to rotate together to transmit power to drive wheels.

6 Claims, 28 Drawing Sheets

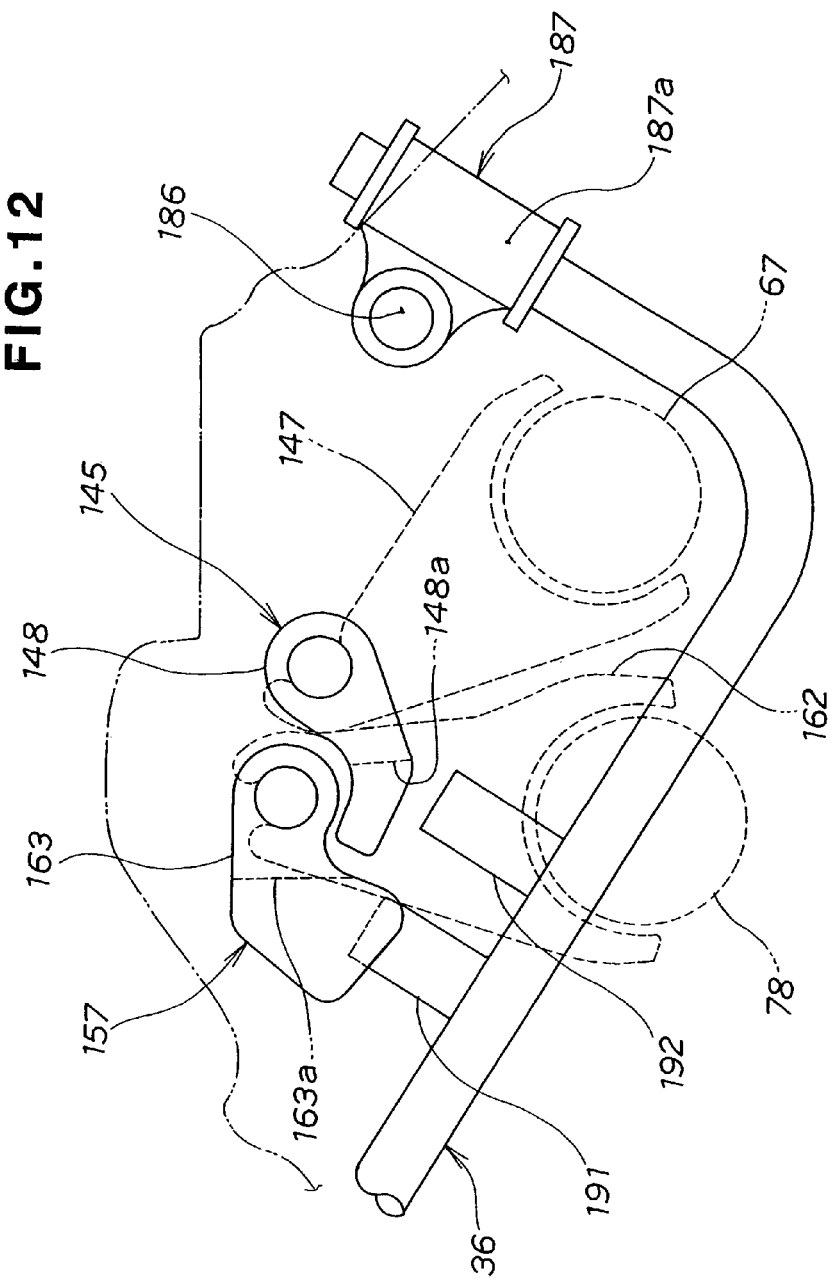

(EMBODIMENT)

(COMP.EXAMPLE)

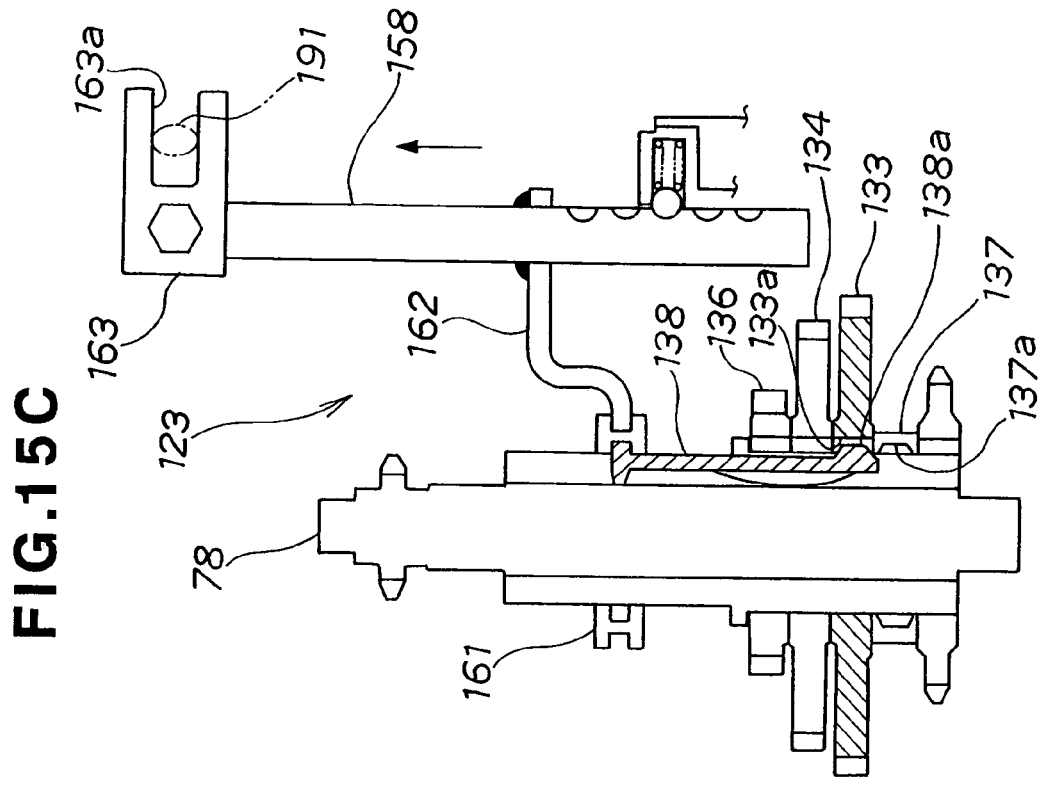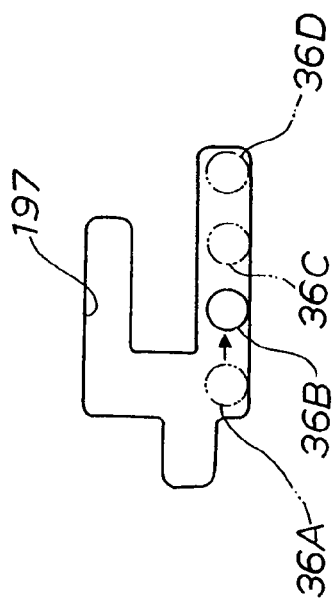

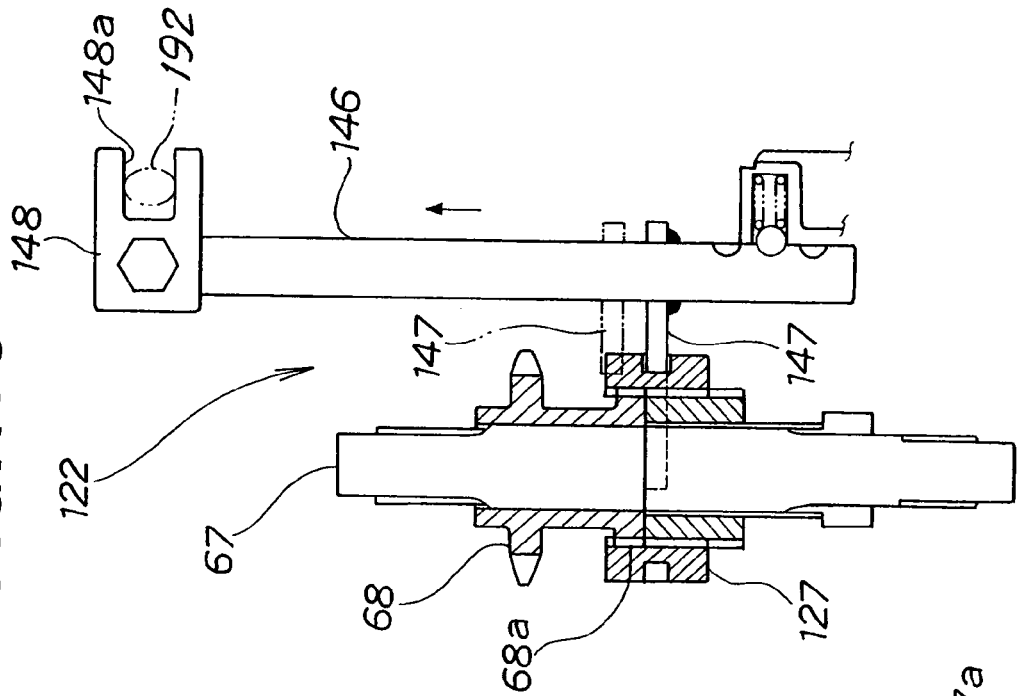
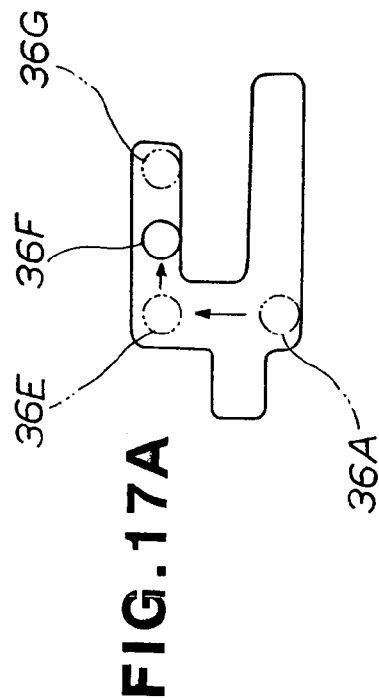
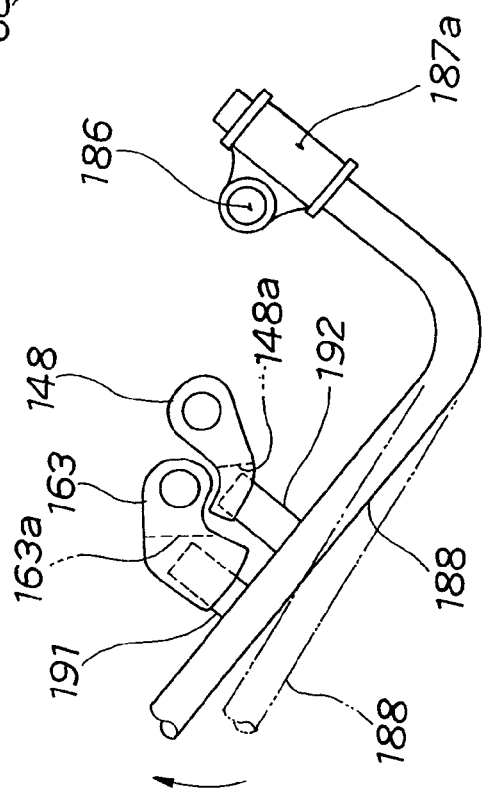
FIG.17C
FIG.17A
FIG.17B

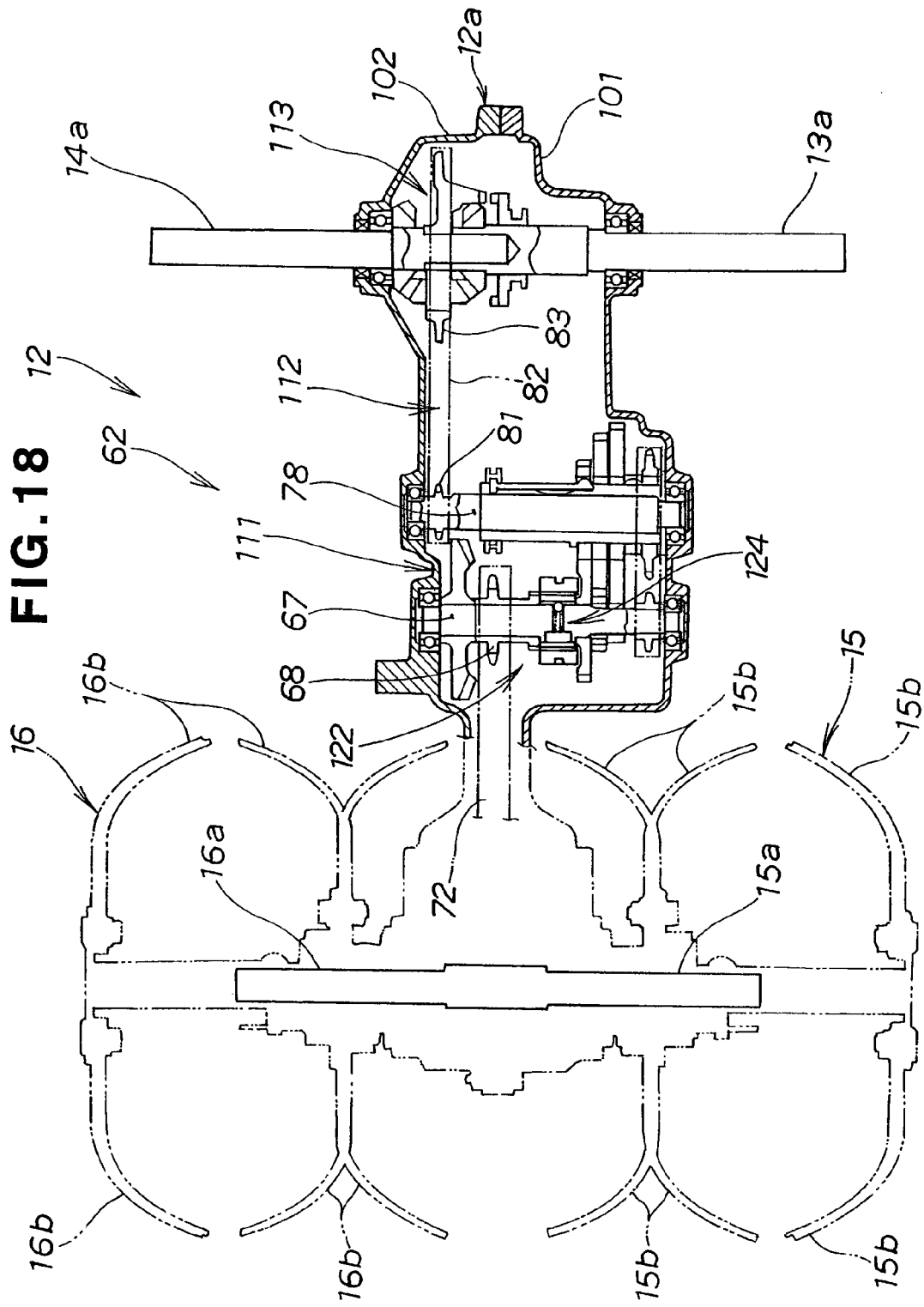

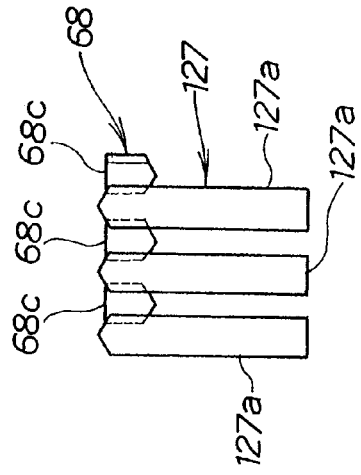
FIG.26E
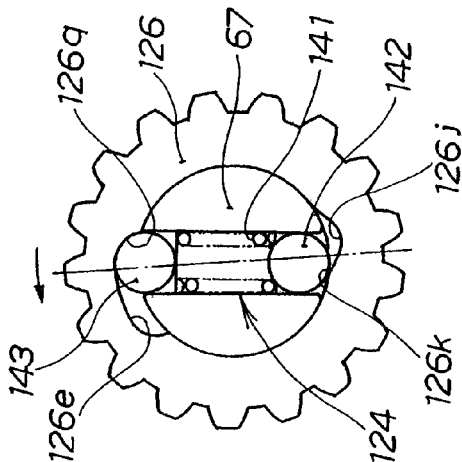
FIG.26F
FIG.26C
FIG.26D
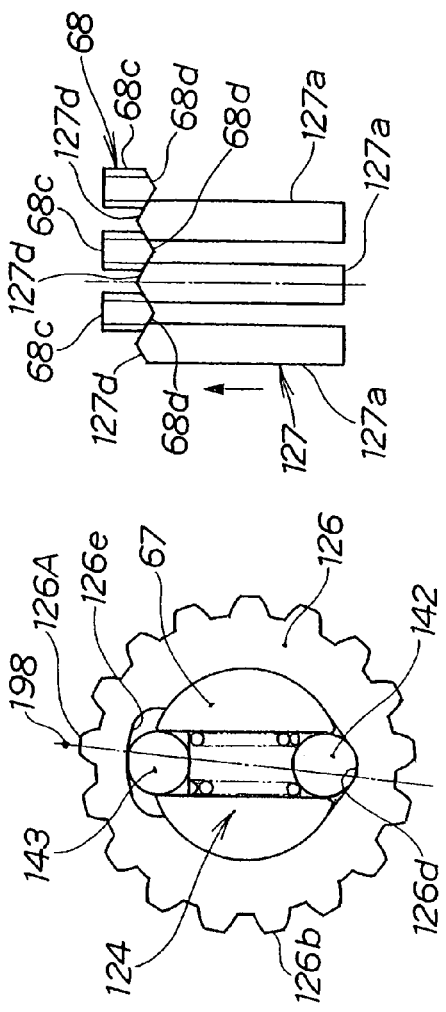
FIG.26A
FIG.26B
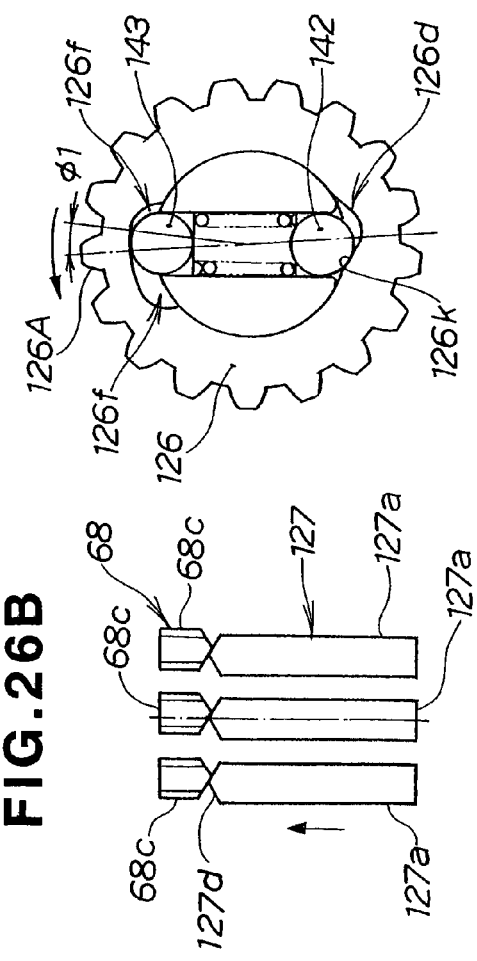

FIG.27A
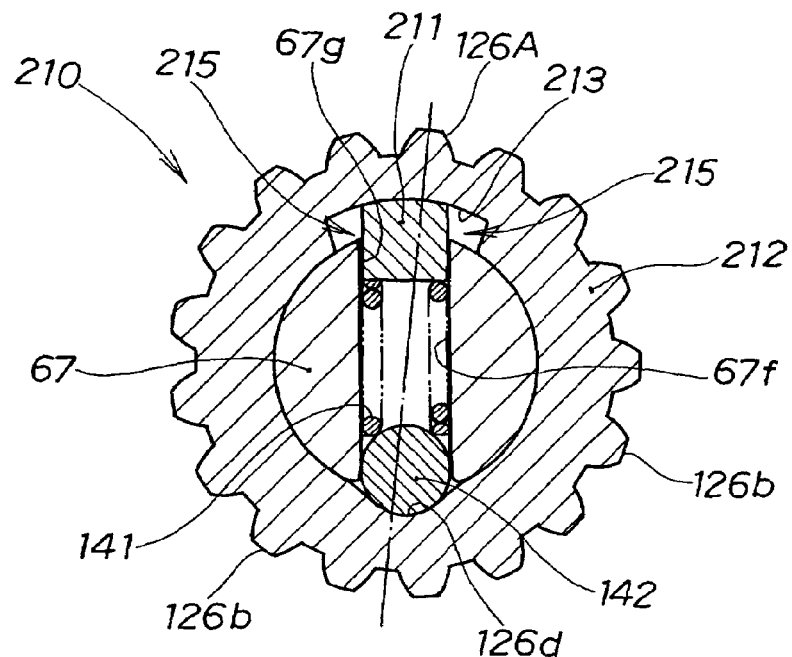
FIG.27B
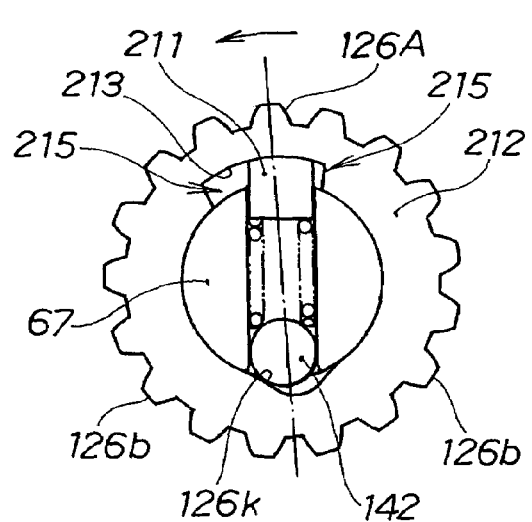
FIG.27C

TRANSMISSION

FIELD OF THE INVENTION

The present invention relates to transmissions for farm working machines and the like.

BACKGROUND OF THE INVENTION

A transmission having a selective-sliding transmission mechanism in which operation of a lever causes a main gear to engage with a selected gear is disclosed, for example, in Japanese Utility Model Laid-Open Publication No. HEI-6-43561.

This transmission using the selective-sliding transmission mechanism will be described with reference to FIGS. 29 and 30.

The transmission shown in FIG. 29 includes an input shaft 402 as a first shaft, second shaft 403, third shaft 404 and output shaft 405 which are rotatably supported in a case 401.

On the input shaft 402, gears 406 and 407 are mounted. On the second shaft 403, gears 408 and 409 are rotatably mounted in constant mesh with the gears 406 and 407. A mechanical clutch 410 for selectively connecting the second shaft 403 to either of the gears 408 and 409 is provided between the gears 408 and 409 on the second shaft 403.

A sliding gear 413 is slidably spline-coupled to the second shaft 403. A loose-fit gear 414 is rotatably mounted on the second shaft 403.

A transmission gear 415 is rotatably mounted on the input shaft 402. The transmission gear 415 includes a gear 415a configured to be engaged or disengaged by slide of the sliding gear 413 and a gear 415b constantly engaging the loose-fit gear 414.

Reference numeral 416 denotes an operating fork for moving the sliding gear 413.

A gear-sliding first sub transmission mechanism 417 for providing two different speeds to the transmission gear 415 by sliding control of the sliding gear 413 consists of the sliding gear 413, loose-fit gear 414 and transmission gear 415.

Referring to FIG. 30, a guide hole 424 in which a main shift lever 422 moves has a horizontal H shape. In the upper side of the guide hole 424, reverse travel, first forward gear, neutral and second forward gear positions are set sequentially from the right end.

Referring to FIG. 29, in the sliding-type first sub transmission mechanism 417, that is, in the selective-sliding transmission mechanism, when the sliding gear 413 rotating with the second shaft 403 and engaging with the loose-fit gear 414 moves rightward in the figure to engage with the transmission gear 415, the sliding gear 413 and the transmission gear 415 cannot easily come into engagement because they are on the different rotating shafts (specifically, second shaft 403 and input shaft 402), being likely to cause noise or tooth wear.

In the transmission pattern shown in FIG. 30, the first forward gear position and the second forward gear position are on the opposite sides of the neutral position. It is thus necessary to control the main shift lever 422 through the neutral position to shift from first forward gear to second forward gear for increasing speed.

If the main shift lever 422 can be controlled without passing through the neutral position, shift between first forward gear and second forward gear is made smoothly, improving the operability. Improved engagement between the gears 413 and 415 further allows shifting without being caught in each gear position, leading to more smooth operation of the main shift lever 422.

It is also possible to interpose a synchromesh transmission mechanism which effects engagement upon synchronization in rotation between the sliding gear 413 and the transmission gear 415, for example, if the gears 413 and 415 cannot easily engage with one another as described above. The synchromesh transmission mechanism, however, has a large number of components whose shapes are complicated, leading to cost and weight increases.

It is thus desired to improve a transmission to increase the operability of a shift lever while limiting increases in cost and weight.

SUMMARY OF THE INVENTION

According to the present invention, there is provided a transmission for varying power of a motor on a working transmission shaft and on a drive transmission shaft by operation of a shift lever for transmission to working devices and drive or run wheels, which transmission comprises: on the working transmission shaft, an input gear for receiving power of the motor; a constant-mesh transmission mechanism for transmitting power of the input gear to the working devices or cutting off the power; and a first gear row comprising a plurality of gears integrally mounted on the working transmission shaft; and on the drive transmission shaft, a second gear row comprising a plurality of gears rotatably mounted on the drive transmission shaft and meshing with the first gear row; and a key-sliding transmission mechanism axially movably mounted for rotating a selected one of the gears and the drive transmission shaft together to transmit power to the drive wheels; and shift members attached to the constant-mesh transmission mechanism and the key-sliding transmission mechanism, respectively, which shift members being axially movable when engaged with the shift lever for effecting a shift operation.

In a conventional selective-sliding transmission mechanism, a gear is moved on a shaft to engage with one of other two gears, which requires the arrangement of a first gear position and a second gear position at the opposite sides of a neutral position, for example, in a shift pattern of a shift lever. In the present invention, the provision of the key-sliding transmission mechanism on the drive transmission shaft allows the sequential alignment of a first gear, second gear and third gear from a neutral position on the drive transmission shaft and sliding a key for sequentially selecting one of the gears for connection with the drive transmission shaft. This facilitates intuitive recognition of the shift pattern of the shift lever and improves the operability of the shift lever because the neutral position is not interposed between the gear positions.

In the transmission of the present invention, the constant-mesh transmission mechanism is used to reduce gear noise or gear wear in gearchange as compared with the conventional selective-sliding transmission mechanism for more smooth gear engagement. Catching in gearchange occurs less and the shift lever can be more smoothly operated.

The constant-mesh transmission mechanism of this invention preferably comprises the working transmission shaft; an input gear mounted on the working transmission shaft; a coupling sleeve having teeth in constant mesh with the input gear; a drive sprocket having a gear for engaging with the coupling sleeve when the sleeve axially moves; and a clutch mechanism for allowing circumferential movement of teeth of the coupling sleeve for engaging or disengaging the teeth of the sleeve with or from the gear of the drive sprocket.

Preferably, the teeth of the coupling sleeve and teeth of the gear have, at first ends thereof, tapers formed opposite to one another.

The clutch mechanism preferably comprises: a hole formed orthogonally to the axis of the working transmission shaft; a protruding member provided to protrude from or retract into a first opening of the hole; an engaging member protruding from a second opening of the hole, engaging an inside peripheral surface of the input gear so as to restrict rotation of the input gear with respect to the working transmission shaft; and a biasing member interposed between the protruding member and the engaging member for pressing the protruding member and the engaging member outward of the hole.

The input gear preferably has, in an inside peripheral surface thereof, a first groove the protruding member can come in and out, and a second groove which allows the engaging member to move in a rotative direction of the working transmission shaft. The first groove preferably includes a depression the protruding member comes in and an inclined surface formed circumferentially continuously from the depression.

In neutral, the biasing or urging member presses the protruding member to the depression and locates the engaging piece movably at a predetermined angle within the recess.

When the teeth of the coupling member are pressed against the teeth of the second gear for gearchange, the coupling member circumferentially moves with the tapers of the teeth of the coupling member contacting the tapers of the teeth of the second gear. That is, the first gear and the coupling member make relative rotation with respect to the working transmission shaft so that the teeth of the coupling member reach the position in which to engage with the teeth of the second gear. In this state, the coupling member is further pressed against the second gear to engage the teeth of the coupling member with the teeth of the second gear. At this time, the protruding member moves from the depression of the cam portion to the inclined surface.

A driving torque of the working transmission mechanism causes the first gear to rotate with respect to the working transmission shaft, causing the engaging piece to contact an inner wall of a circumferential edge of the recess formed in the first gear, thereby transmitting power from the working transmission shaft to the first gear.

As described above, instead of only connecting the gear integrally mounted on the working transmission shaft to the second gear via the coupling member, the present invention includes the clutch mechanism having the tapers at the teeth of the coupling member and the teeth of the second gear and having the recess provided in the first gear which allows the engaging member to move at a predetermined angle in a rotative direction of the working transmission shaft, so that, when the teeth of the coupling member and the teeth of the second gear are not in engagement positions in the initial stages of the shift operation, the teeth of the coupling member can circumferentially move to a position in which to engage with the teeth of the second gear. This facilitates engagement between the coupling member and the second gear, allowing smooth connection between the coupling member and the second gear, and improving the operability of the shift lever. The shift lever operation thus requires no skill.

In the above-described transmission, additional components to the conventional one for improving the operability of the shift lever are only the protruding member, engaging member and biasing member, resulting in reduced increases in cost and weight.

BRIEF DESCRIPTION OF THE DRAWINGS

Certain preferred embodiments of the present invention will be described in detail below, by way of example only, with reference to the accompanying drawings, in which:

FIG. 12 is a diagram illustrating the relationship between the shift lever shown in FIG. 11, a working arm member and a drive arm member;

FIGS. 15A, 15B and 15C are diagrams illustrating the working of the drive transmission mechanism when the shift lever is moved from a drive neutral position to a first forward gear position;

FIGS. 17A, 17B and 17C are diagrams illustrating the working of the working transmission mechanism when the shift lever is moved from the drive neutral position through a working neutral position to a working first gear position;

FIG. 18 is a cross-sectional view of a drive unit according to a second embodiment of the present invention;

FIGS. 26A to 26F are diagrams illustrating the working of a clutch mechanism shown in FIG. 21;

FIGS. 27A to 27C are diagrams illustrating the configuration and working of a clutch mechanism according to a third embodiment of the present invention;

DETAILED DESCRIPTION OF THE PREFERRED EMBODIMENTS

A working machine in the present invention is exemplified by a tiller 10 as a walk-behind farm working or tilling machine.

Figure 1:
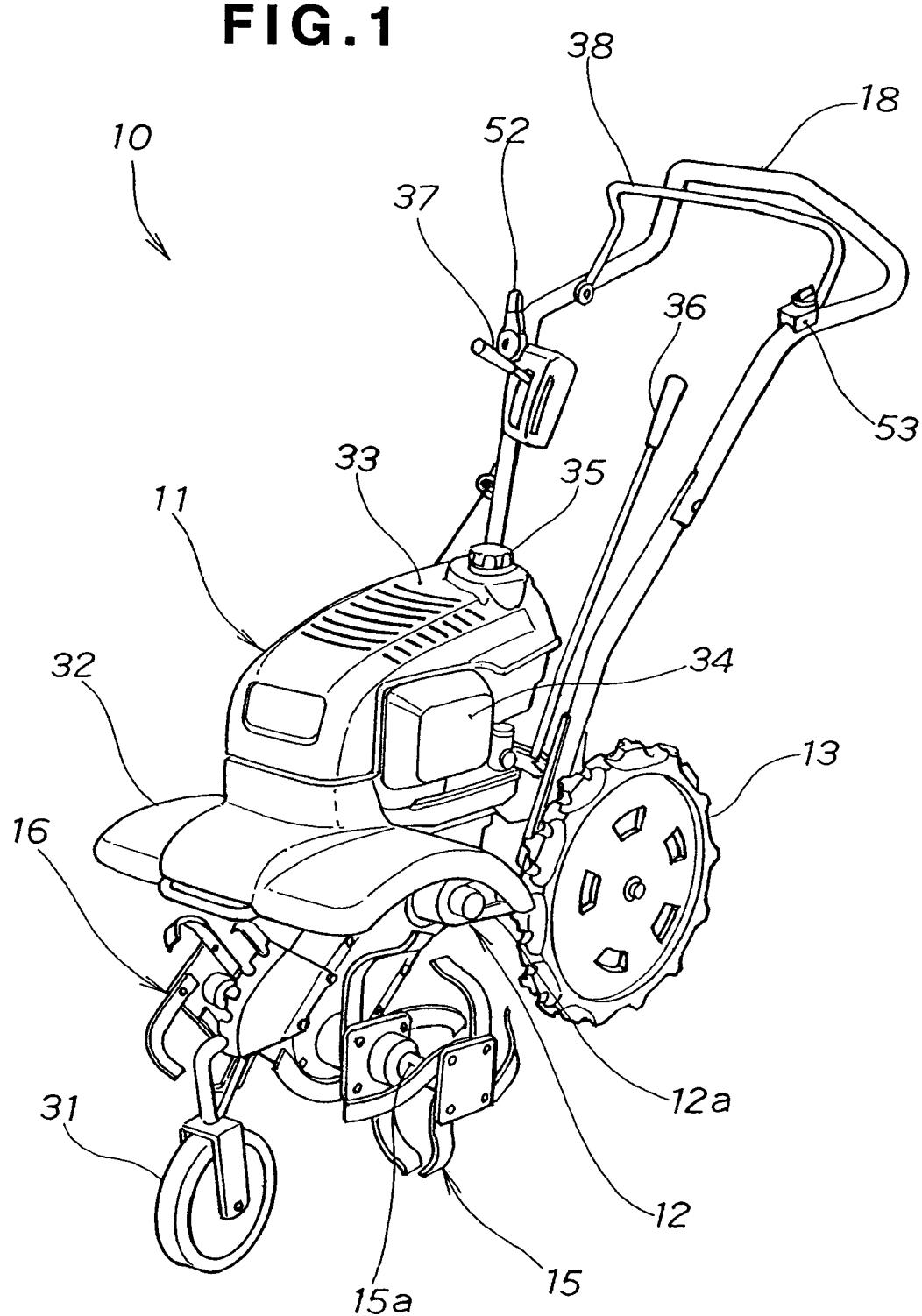
FIG. 1 is a perspective view of a walk-behind tiller provided with a transmission according to the present invention.

The tiller 10 shown in FIG. 1 includes an engine (motor) 11. The engine 11 transmits power via a drive unit 12 to left and right drive wheels 13, 14 (see FIG. 3) and left and right tilling devices 15, 16 arranged forward of the drive wheels 13, 14. A ridger, for example, is connected to the rear of a transmission case 12a constituting a part of the drive unit 12. The tiller 10 plows a field with the tilling devices 15, 16 while making ridges with the ridger.

Figure 2:
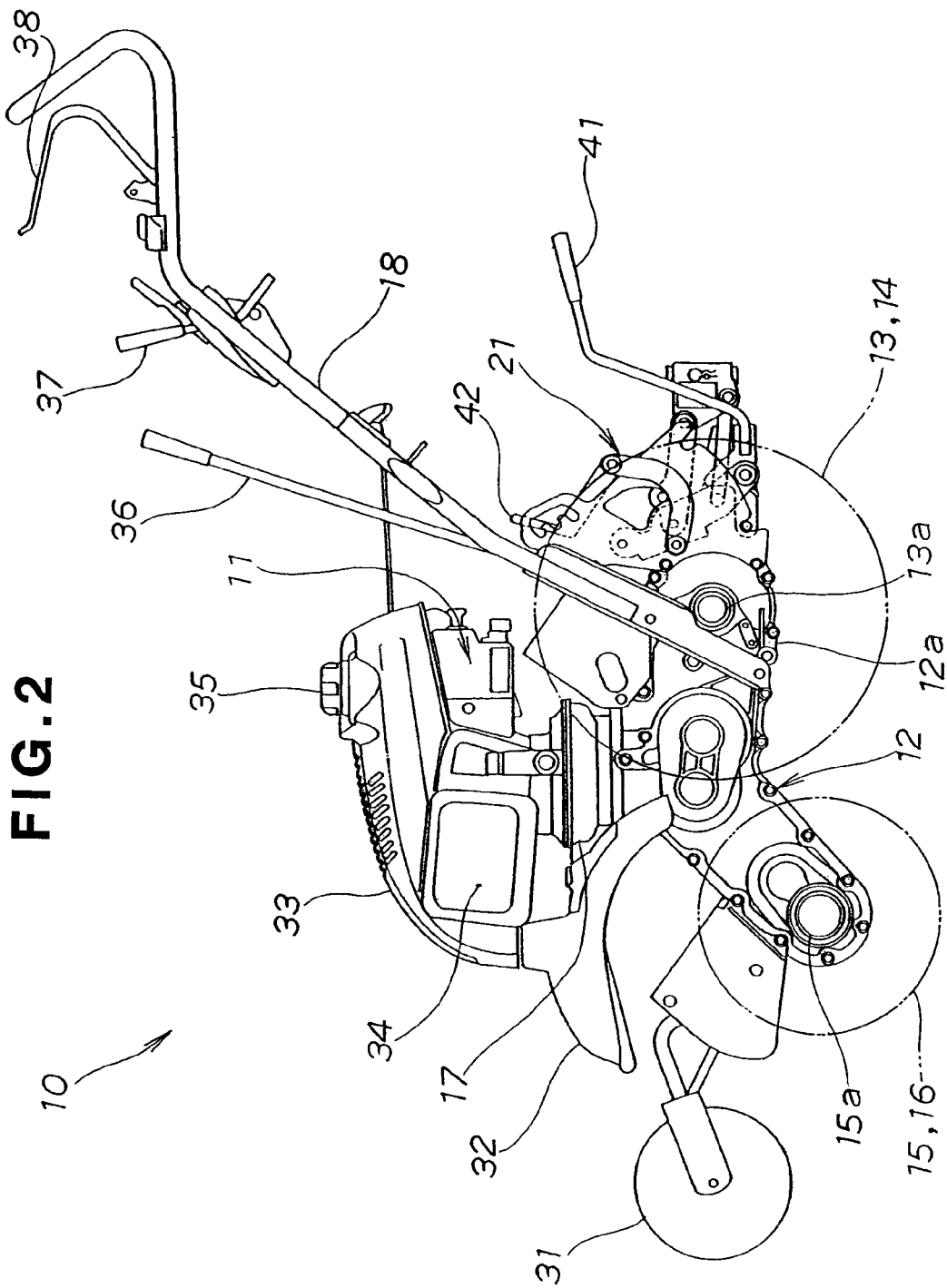
FIG. 2 is a side view of the tiller shown in FIG. 1.

As shown in FIG. 2, the tiller 10 includes the engine 11 disposed on top of the machine body, the drive unit 12 mounted below the engine 11, the tilling devices (working devices) 15, 16 rotatably mounted to the front of the drive unit 12 via left and right tilling shafts 15a, 16a (see FIG. 6), the drive wheels 13, 14 rotatably mounted to the rear of the drive unit 12 via a left axle 13a and a right axle 14a (see FIG. 3), a handle 18 obliquely extended in a rearward and upward direction from the rear of the transmission case 12a, and a connecting mechanism 21 mounted to the rear end of the transmission case 12a.

A clutch case 17 houses a clutch (described below) constituting a part of the drive unit 12. An auxiliary wheel 31 is mounted to a front end portion of the transmission case 12a in a vertically adjustable manner. A front portion of the transmission case 12a and the top of the tilling devices 15, 16 are covered by a fender 32. An engine cover 33 covers the top of the engine 11.

Reference numeral 34 denotes an air cleaner and 35 a fuel tank filler cap. Reference numeral 36 denotes a shift lever and 37 a differential lock lever. Reference numeral 38 denotes a clutch lever.

The ridger connected to the connecting mechanism 21 is turned up by a lifting lever 41. A sinking position adjustment lever 42 adjusts the sinking position of the ridger connected to the connecting mechanism 21.

Figure 3:
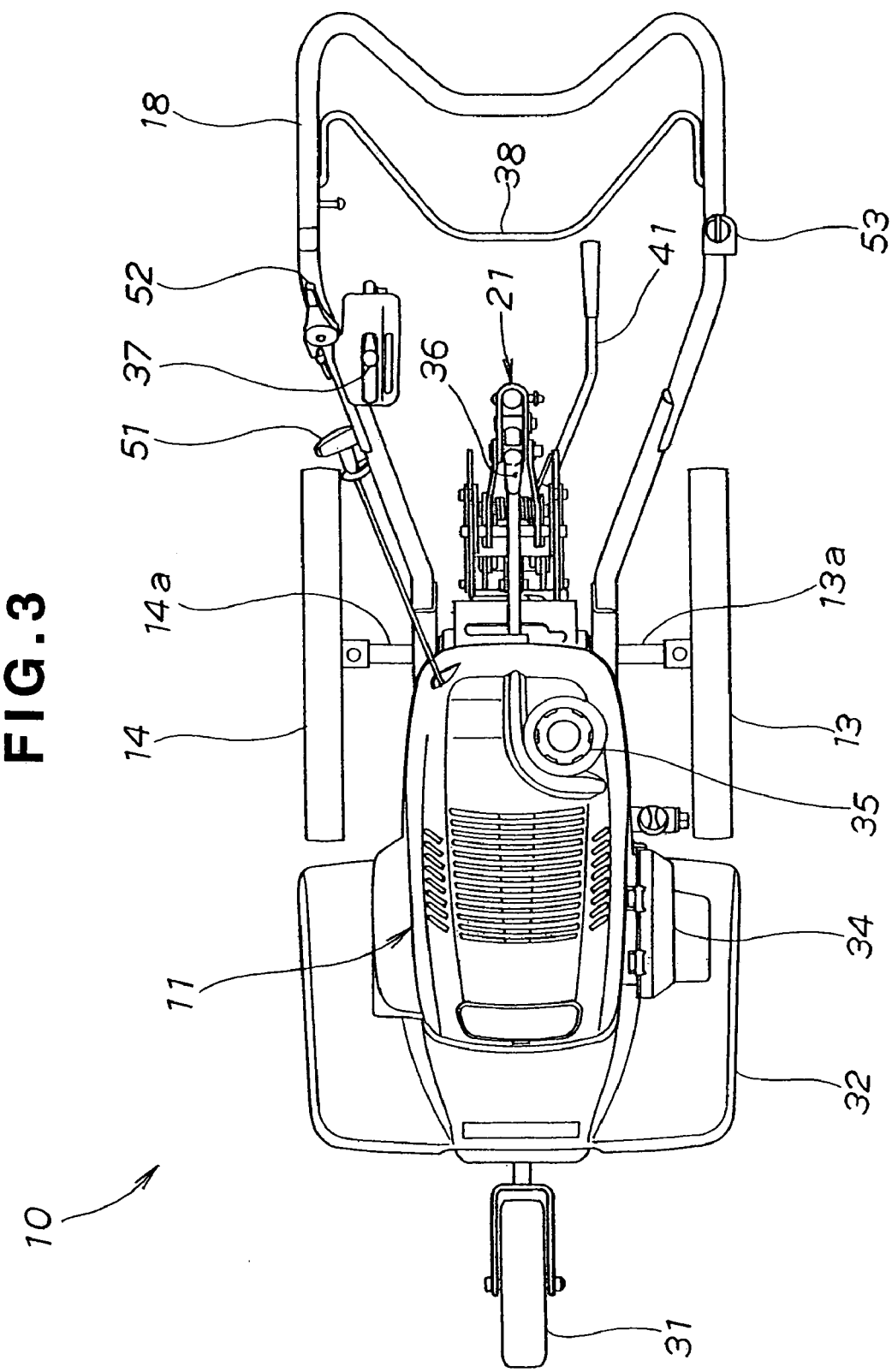
FIG. 3 is a plan view of the tiller shown in FIG. 2.

As shown in FIG. 3, a recoil starter knob 51 for starting the engine 11, a throttle lever 52 for adjusting the rpm of the engine 11 and the differential lock lever 37 are arranged at a right front portion of the handle 18.

An engine switch 53 for making the engine 11 operable or stopped is attached to a left rear portion of the handle 18.

A clutch lever 38 is mounted at a rear portion of the handle 18. The shift lever 36 extends rearward from a rear middle portion of the drive unit 12 (see FIG. 1). The lifting lever 41 extends rearward from a left rear portion of the connecting mechanism 21.

Figure 4:
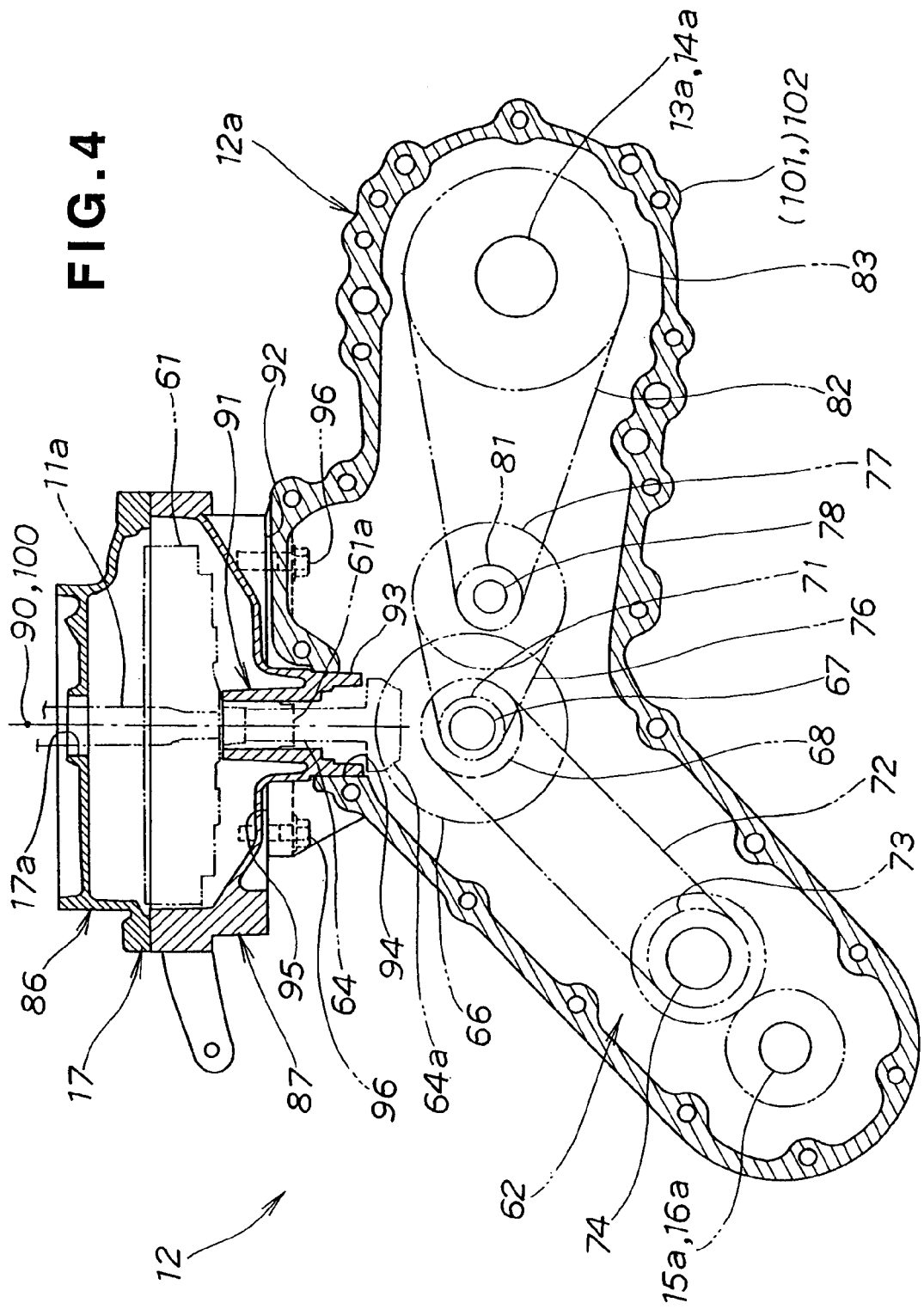
FIG. 4 is a cross-sectional view of a drive unit including the transmission according the present invention.

FIG. 4 illustrates the drive unit 12 including a transmission according to the present invention.

The drive unit 12 is, as shown in FIG. 3, a system for transmitting power of the engine 11 to the drive wheels 13, 14 and the tilling devices 15, 16 (see FIG. 2). The drive unit 12 includes a clutch 61 connected to a crankshaft 11a of the engine 11, a power transmission mechanism 62 connected to the clutch 61, the clutch case 17, and the transmission case 12a housing the power transmission mechanism 62.

An input shaft of the clutch 61 is connected to the crankshaft 11a, and an output shaft 61a is connected to an input shaft 64 of the power transmission mechanism 62.

The power transmission mechanism 62 has the input shaft 64, a bevel gear (input gear) 66, a working shaft (working transmission shaft) 67, a first drive sprocket 68, a second drive sprocket 71, a first driven sprocket 73, an auxiliary tilling shaft 74, the tilling shafts 15a, 16a, a second driven sprocket 77, a drive shaft (drive transmission shaft) 78, a third drive sprocket 81, a third driven sprocket 83, and the left and right axles 13a, 14a.

The bevel gear 66 engages a bevel gear 64a formed on the input shaft 64. The working shaft 67 supports the bevel gear 66. The first drive sprocket 68 and second drive sprocket 71 are mounted on the working shaft 67.

The first driven sprocket 73 is connected to the first drive sprocket 68 via a first chain 72. The first driven sprocket 73 is supported on the auxiliary tilling shaft 74.

The tilling shafts 15a, 16a receive driving force from the auxiliary tilling shaft 74 via a plurality of gears.

The second driven sprocket 77 is connected to the second drive sprocket 71 via a second chain 76 and is supported on the drive shaft 78.

The third drive sprocket 81 is integrally formed on the drive shaft 78.

The third driven sprocket 83 is connected to the third drive sprocket 81 via a third chain 82.

The left and right axles 13a, 14a receive driving force from the third driven sprocket 83.

The working shaft 67 and the drive shaft 78 are components of the transmission to be described below.

The clutch case 17 has an upper case 86 having a shaft insertion hole 17a through which the crankshaft 11a is inserted and a lower case 87 attached to the bottom of the upper case 86.

The lower case 87 has a substantially cylindrical bearing 91 rotatably supporting the clutch output shaft 61a and the input shaft 64, and a clutch mounting surface (first mating surface) 92 for mounting to the transmission case 12a.

The bearing 91 has at its lower portion a tubular portion 93 to be fitted to the transmission case 12a.

In the figure, reference numeral 90 denotes a shaft center of the tubular portion 93. The clutch mounting surface 92 is a horizontal plane orthogonal to the shaft center 90.

Figure 5:
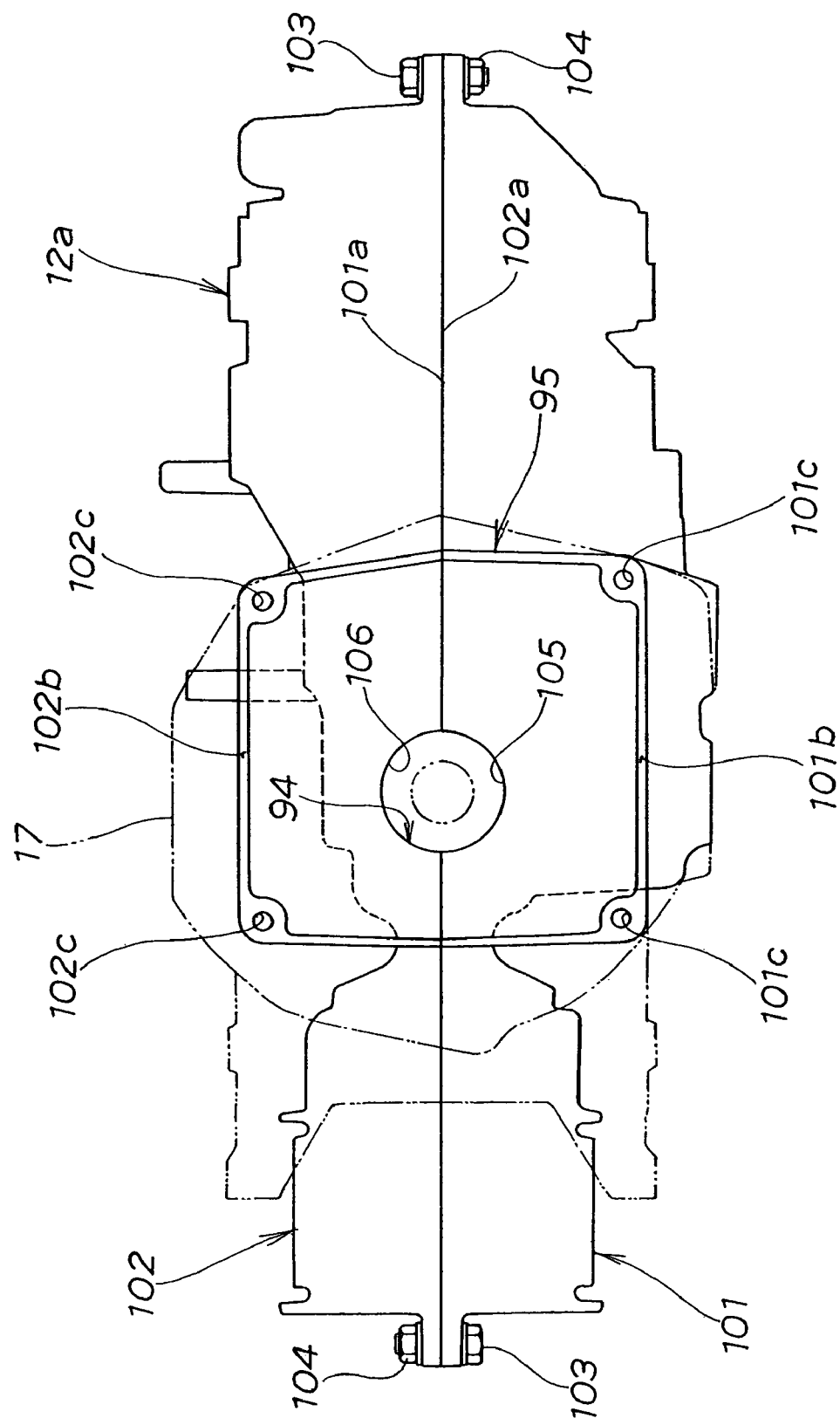
FIG. 5 is a plan view of a transmission case and a clutch case shown in FIG. 4.

The transmission case 12a is, as shown in FIG. 5, split into left and right halves. The transmission case 12a has, at its upper portion, a fitting hole 94 for fitting to the tubular portion 93 of the clutch case 17 and a transmission mounting surface 95 to be attached to the clutch mounting surface 92 of the clutch case 17.

The clutch case 17 and the transmission case 12a are joined by a plurality of bolts 96.

In the figure, reference numeral 100 denotes a shaft center of the fitting hole 94, which agrees with the shaft center 90. The transmission mounting surface 95 is a horizontal plane orthogonal to the shaft center 100.

FIG. 5 illustrates the transmission case 12a shown in solid lines and the clutch case 17 shown in imaginary lines.

The transmission case 12a consists of a left case 101 and a right case 102. The left and right cases 101, 102 are mated together at their respective mating surfaces 101a, 102a. The left case 101 and the right case 102 have, at their upper portions, a substantially U-shaped left mounting surface 101b and right mounting surface 102b, respectively.

The left case 101 and the right case 102 are mated with a plurality of bolts 103 and nuts 104.

The left mounting surface 101b and the right mounting surface 102b constitute the transmission mounting surface 95 shown in FIG. 4, having bolt insertion holes 101c, 101c, 102c, 102c, respectively, for receiving the bolts 96.

The fitting hole 94 of the transmission case 12a consists of a left semicircular hollow 105 formed in a semicircle in the left case 101 and a right semicircular hollow 106 formed in a semicircle in the right case 102.

The transmission mounting surface 95 is a horizontal plane orthogonal to the shaft center 100 shown in FIG. 4. The left mounting surface 101b and the right mounting surface 102b are thus horizontal planes orthogonal to the shaft center 100.

Figure 6:
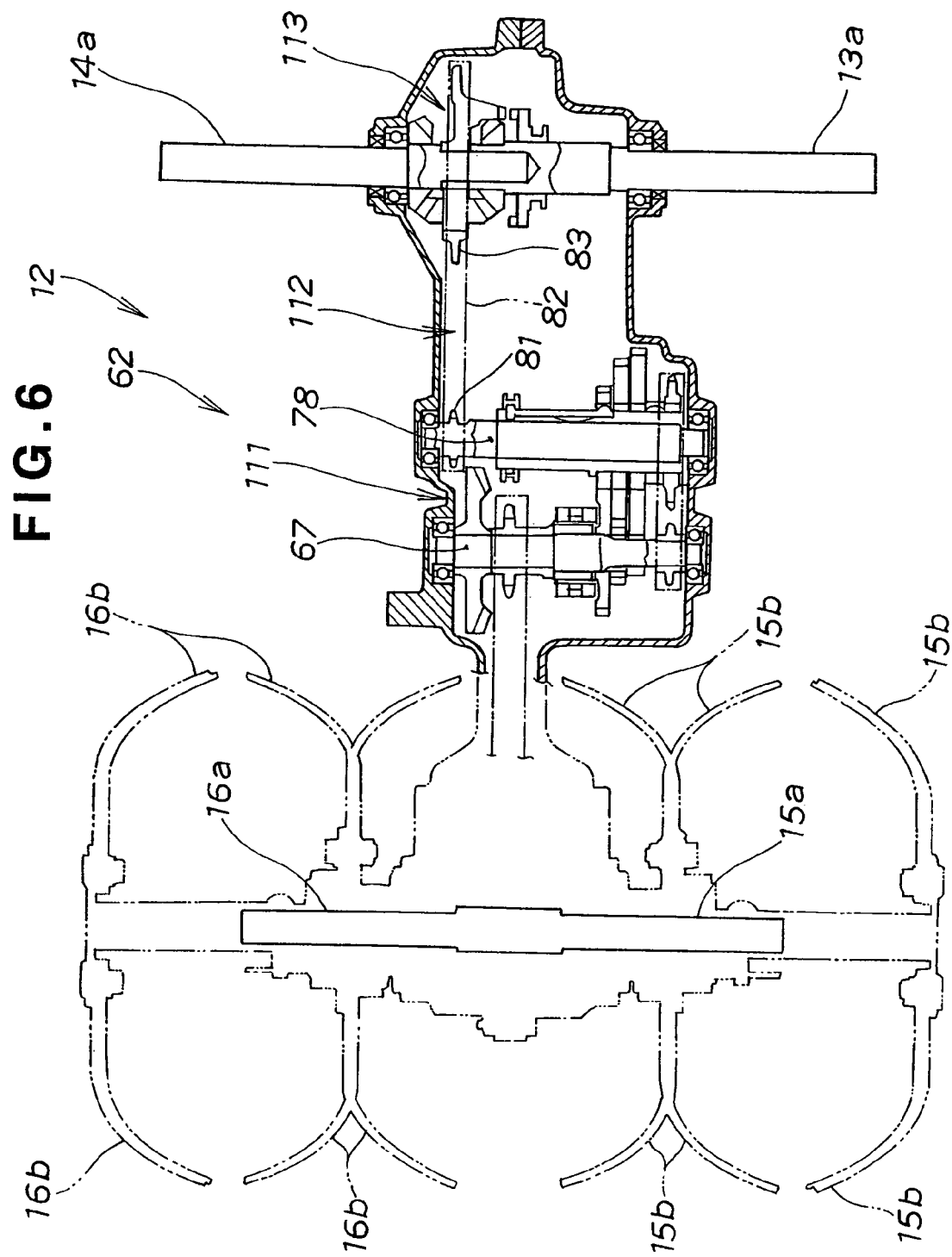
FIG. 6 is a cross-sectional view of the drive unit according to the present invention.

As shown in FIG. 6, the power transmission, mechanism 62 of the drive unit 12 includes a transmission 111 having the working shaft 67 and the drive shaft 78, a chain-drive reduction gear 112 connected to the transmission 111, a differential 113 connected to the reduction gear 112, and the left axle 13a and the right axle 14a connected to the left and right of the differential 113.

Reference numerals 15b and 16b denote tillage tines mounted on the tilling shafts 15a, 16a.

The reduction gear 112 includes the third drive sprocket 81, the third driven sprocket 83, and the third chain 82 extended between the third drive sprocket 81 and the third driven sprocket 83.

Figure 7:
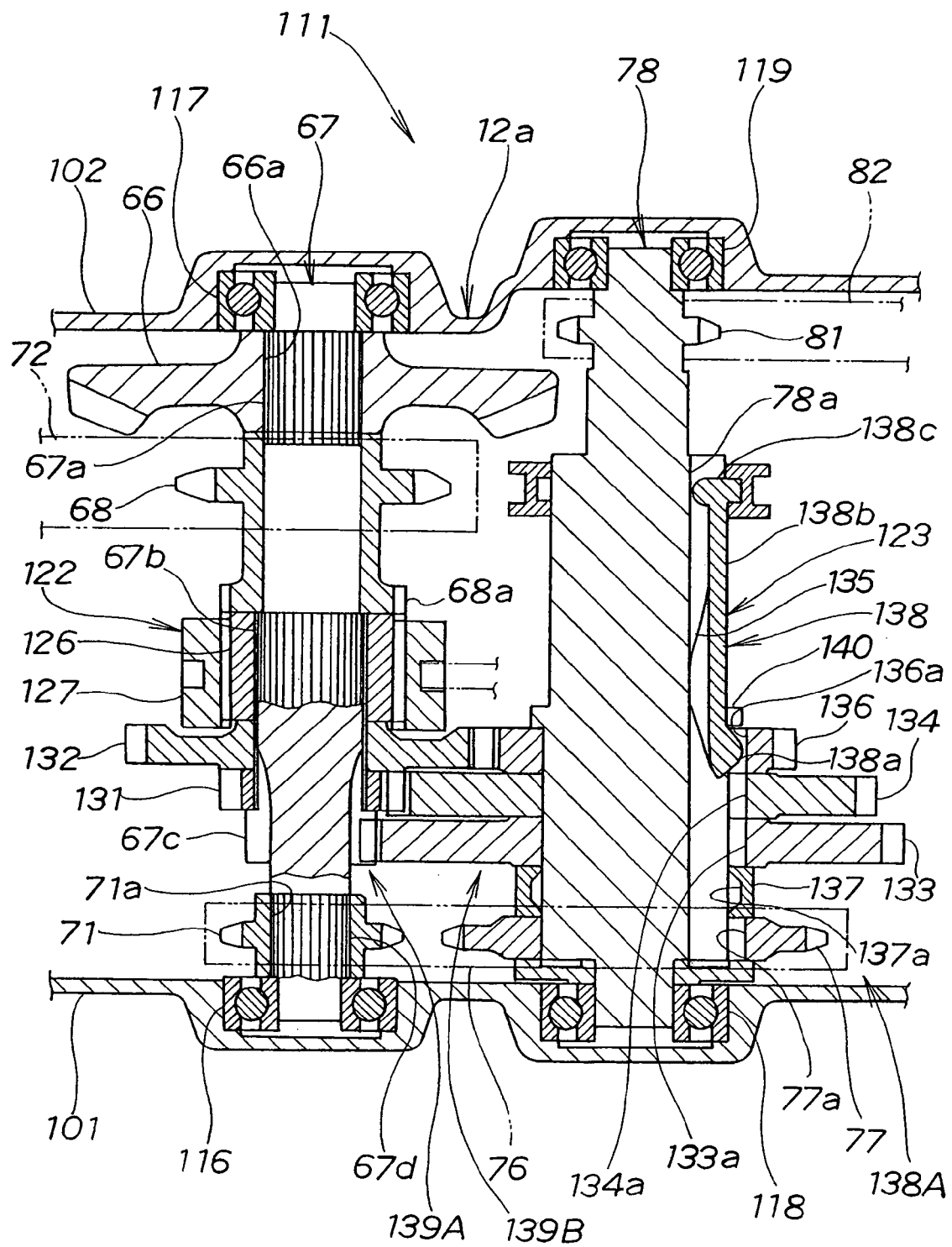
FIG. 7 is an enlarged cross-sectional view of the transmission shown in FIG. 6.

FIG. 7 is an enlarged cross-sectional view of the transmission 111 according to the present invention shown in FIG. 6. The transmission 111 has the working shaft 67 and the drive shaft 78 rotatably mounted to the left case 101 and right case 102 of the transmission case 12a via bearings 116, 117, 118 and 119, a working transmission mechanism 122 provided on the working shaft 67, and a drive transmission mechanism 123 provided on the drive shaft 78.

The working shaft 67 has first male splines 67a spline-coupled to female splines 66a formed in the bevel gear 66, second male splines 67b provided in its intermediate portion, a first drive gear 67c integrally formed thereon for engagement with the drive transmission mechanism 123, and third male splines 67d spline-coupled to female splines 71a formed in the second drive sprocket 71.

In this embodiment, the working transmission mechanism 122 allows change between zero speed and two rotational speeds of the working shaft 67 by transmitting torque of the working shaft 67 to the first drive sprocket 68 or disengaging them. In that sense, the terms "transmission mechanism" are used.

The working transmission mechanism 122 includes the working shaft 67, an input gear (first gear) 126 spline-coupled to the second male splines 67b on the working shaft 67, a coupling sleeve 127 in engagement with the input gear 126, and the first drive sprocket 68 having a gear (second gear) 68a to engage with the coupling sleeve 127 when the sleeve 127 is longitudinally moved along the working shaft 67.

The first drive sprocket 68 is constantly connected to the first driven sprocket 73 shown in FIG. 4 via the first chain 72. The working transmission mechanism 122 is thus a constant-mesh transmission mechanism.

The drive transmission mechanism 123 includes the drive shaft 78, the first drive gear 67c, a second drive gear 131, a third drive gear 132 and the second drive sprocket 71 on the working shaft 67, the second chain 76, the second driven sprocket 77, a first driven gear 133, a second driven gear 134, a third driven gear 136, a neutral positioning ring 137, and a sliding key 138.

The second and third drive gears 131, 132 are spline-coupled to the second male splines 67b on the working shaft 67.

The first, second and third driven gears 133, 134 and 136 are rotatably fitted on the drive shaft 78. The first driven gear 133 engages the first drive gear 67c on the working shaft 67. The second driven gear 134 engages the second drive gear 131. The third driven gear 136 engages the third drive gear 132.

The neutral positioning ring 137 is rotatably fitted on the drive shaft 78 for providing the neutral position in gear shift.

The sliding key 138 is movably disposed in a longitudinal groove 78a formed axially in an external surface of the drive shaft 78.

The drive shaft 78, sliding key 138, neutral positioning ring 137, first driven gear 133, second driven gear 134, third driven gear 136 and second driven sprocket 77 constitute a key-sliding transmission mechanism 138A.

The first driven gear 133, second driven gear 134, third driven gear 136 and second driven sprocket 77 have, in the surfaces along which the drive shaft 78 are inserted, their respective engaged grooves 133a, 134a, 136a and 77a for engagement with the sliding key 138.

The first drive gear 67c, second drive gear 131 and third drive gear 132 constitute a first gear row 139A. The first driven gear 133, second driven gear 134 and third driven gear 136 constitute a second gear row 139B.

The neutral positioning ring 137 has, in its surface along which the drive shaft 78 extends, an engaged hollow 137a for engagement with the sliding key 138.

The sliding key 138 consists of an engaging claw 138a formed for engagement with the engaged groove 133a, 134a, 136a or 77a or the engaged hollow 137a, a linear portion 138b extending from the engaging claw 138a, and a fixed end 138c formed at the proximal end of the linear portion 138b.

A spring 135 is provided at the back of the engaging claw 138a and the linear portion 138b for pressing the sliding key 138 toward the engaged grooves 133a, 134a, 136a and 77a and the engaged hollow 137a.

Reference numeral 140 denotes a stopper for the sliding key 138. The stopper 140 is provided on the drive shaft 78.

First forward travel gear is effected by the first drive gear 67c and first driven gear 133. Second forward travel gear is effected by the second drive gear 131 and second driven gear 134. Third forward travel gear is effected by the third drive gear 132 and third driven gear 136. Reverse travel is effected by the second drive sprocket 71, second chain 76 and second driven sprocket 77.

Figure 8:
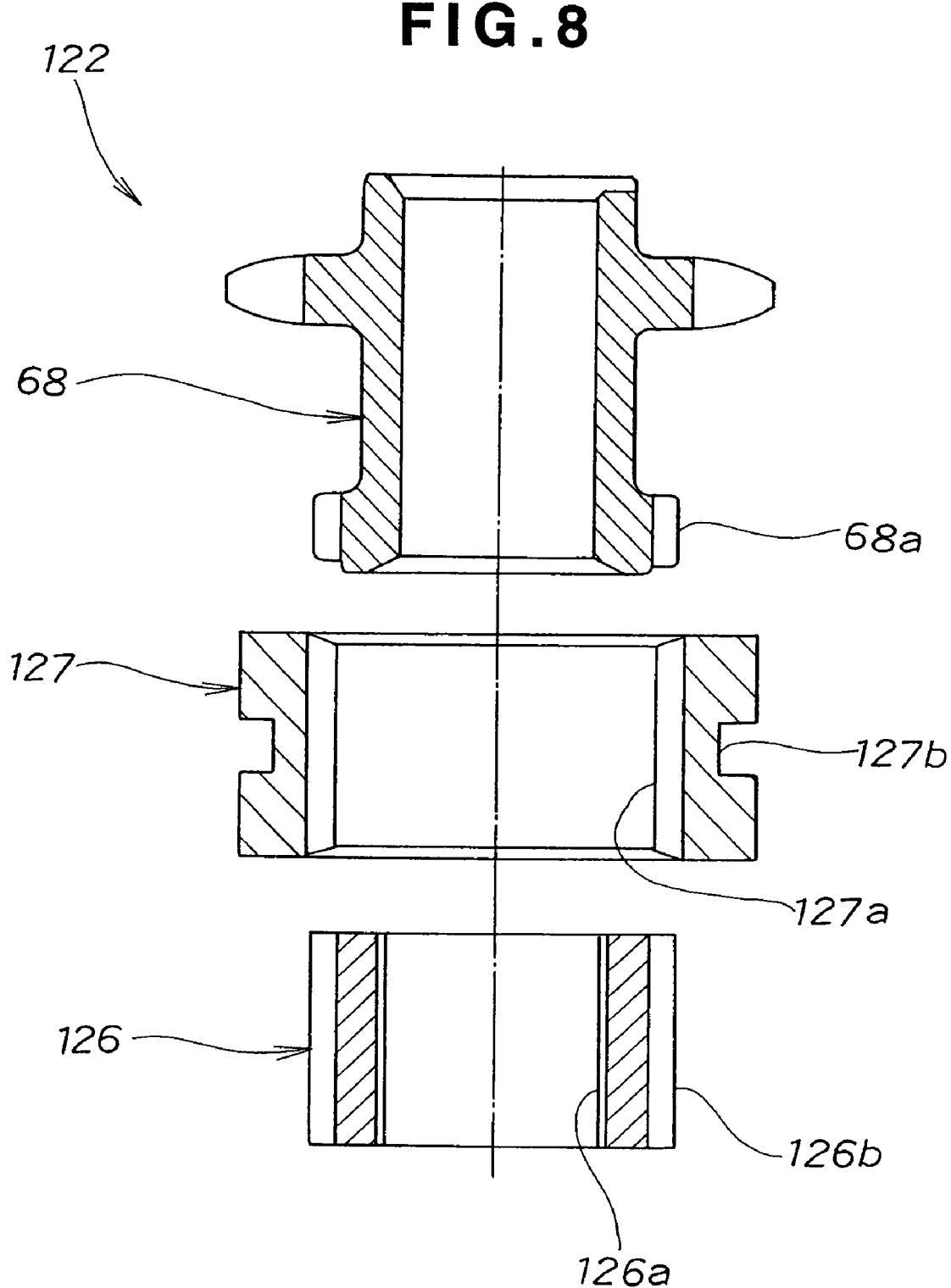
FIG. 8 is a cross-sectional view of a first drive sprocket, a coupling sleeve and an input gear of a working transmission mechanism shown in FIG. 7.

FIG. 8 illustrates the first drive sprocket 68, coupling sleeve 127 and input gear 126 as components of the working transmission mechanism 122 shown in FIG. 7.

The working shaft 67 and the input gear 126 shown in FIG. 7 are mated by spline-coupling the second male splines 67b formed on the working shaft 67 to female splines 126a formed in the input gear 126.

Teeth 126b formed on the periphery of the input gear 126 mesh with teeth 127a formed in the coupling sleeve 127.

The coupling sleeve 127 is slid along the axis of the input gear 126 toward the first drive sprocket 68, thereby to cause the teeth 127a in the coupling sleeve 127 to mesh with the coupling teeth 68a formed on the periphery of the first drive sprocket 68. The coupling sleeve 127 has an annular groove 127b formed in its peripheral surface.

The coupling sleeve 127 and the first drive sprocket 68 to be coupled together are on the same working shaft 67. When the coupling sleeve 127 is connected to the first drive sprocket 68, the teeth 127a of the coupling sleeve 127 smoothly mesh with the gear 68a of the first drive sprocket 68a, hardly causing noise (due to disagreement in revolution speed in gear shift), and hardly causing tooth wear or breakage. In the case where two shafts are arranged in parallel and a gear C slidably mounted on one shaft is selectively mated with either of two gears A and B mounted on the other shaft (such a transmission mechanism is referred to as a "selective-sliding transmission mechanism"), the gears A and C (or gears B and C) cannot easily engage with one another and are likely to cause noise or tooth breakage.

Figure 9:
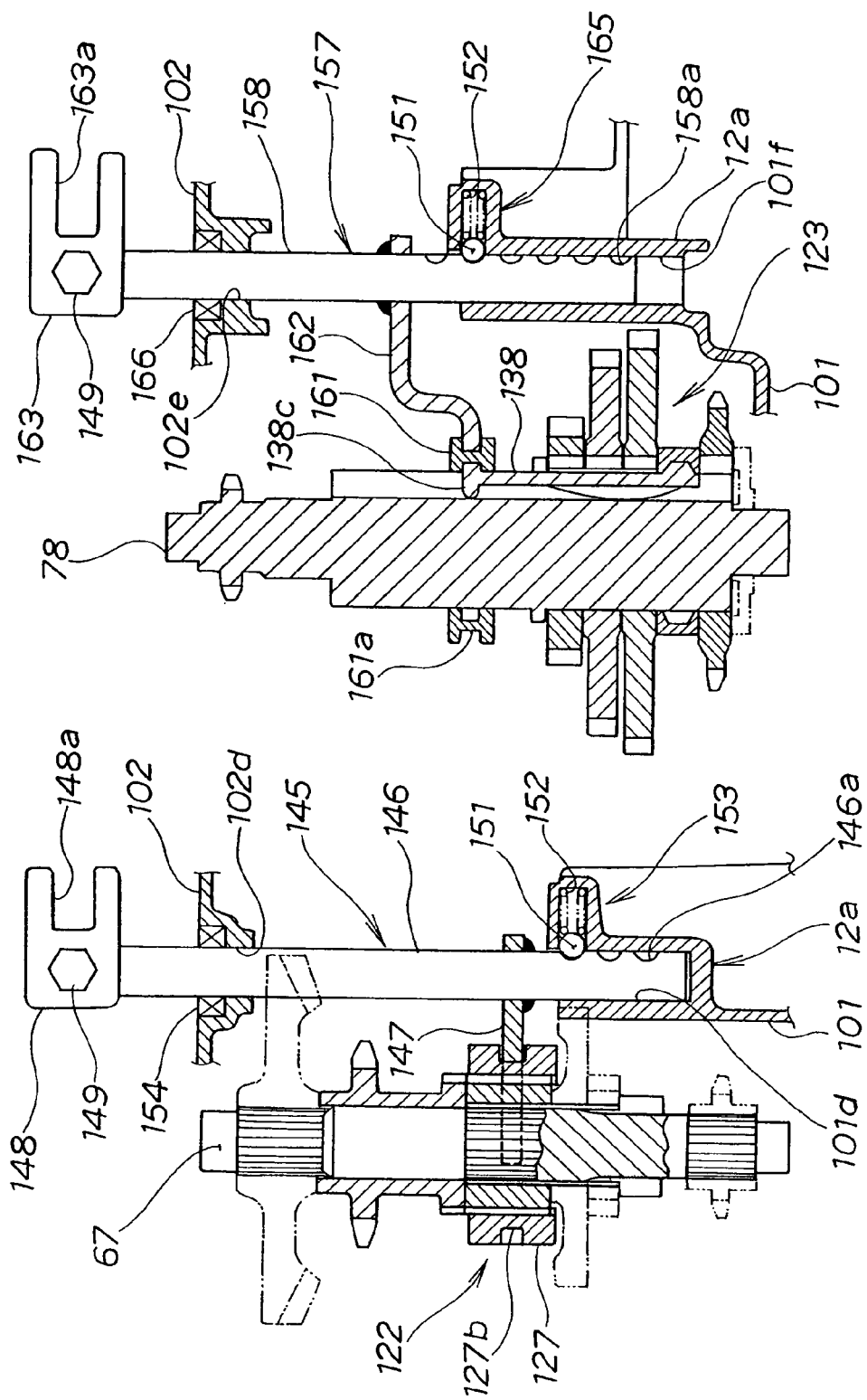
FIGS. 9A and 9B are cross-sectional views of the working transmission mechanism provided with a working shift member and a drive transmission mechanism provided with a drive shift member.

FIG. 9A illustrates a working shift member (shift member) 145 provided to the working transmission mechanism 122. FIG. 9B illustrates a drive shift member (shift member) 157 provided to the drive transmission mechanism 123.

Referring to FIG. 9A, the working shift member 145 includes a working shift rod 146 axially slidably mounted to the transmission case 12a, a working fork member 147 mounted on an intermediate portion of the working shift rod 146 to be fitted into the annular groove 127b of the coupling sleeve 127, and a working arm member 148 attached to an end of the working shift member 146 protruded outward of the transmission case 12a for engagement with the shift lever 36 (see FIG. 3).

The working arm member 148 is attached to the working shift rod 146 with a bolt 149 and has an engaged hollow 148a for engaging with the shift lever 36.

For supporting the working shift rod 146, the left case 101 has a hole 101d for receiving a distal end portion of the working shift rod 146, and a working step-sliding mechanism 153 for sliding the working shift rod 146 in steps by pressing a ball 151 with a spring 152 against one of a plurality of circular hollows 146a provided in the distal end portion of the working shift rod 146.

The right case 102 has a through hole 102d for passing the working shift rod 146 therethrough and a dust seal 154 provided adjacently to the through hole 102d.

As shown in FIG. 9B, the drive shift member 157 includes a drive shift rod 158 axially slidably mounted to the transmission case 12a, an H-shaped section annular member 161 engaged with the fixed end 138c of the sliding key 138, a drive fork member 162 mounted on an intermediate portion of the drive shift rod 158 for insertion into an annular groove 161a formed in the external surface of the annular member 161, and a drive arm member 163 attached to an end of the drive shift rod 158 protruded outward of the transmission case 12a for engagement with the shift lever 36 (see FIG. 3).

The drive arm member 163 is attached to the drive shift rod 158 via a bolt 149 and has an engaged hollow 163a for engaging with the shift lever 36.

For supporting the drive shift rod 158, the left case 101 has a hole 101e for receiving a distal end portion of the drive shift rod 158, and a drive step-sliding mechanism 165 for sliding the drive shift rod 158 in steps by pressing a ball 151 with a spring 152 against one of a plurality of circular hollows 158a formed in the distal end portion of the drive shift rod 158.

The right case 102 has a through hole 102e for passing the drive shift rod 158 therethrough and a dust seal 166 provided adjacently to the through hole 102e.

Figure 10:
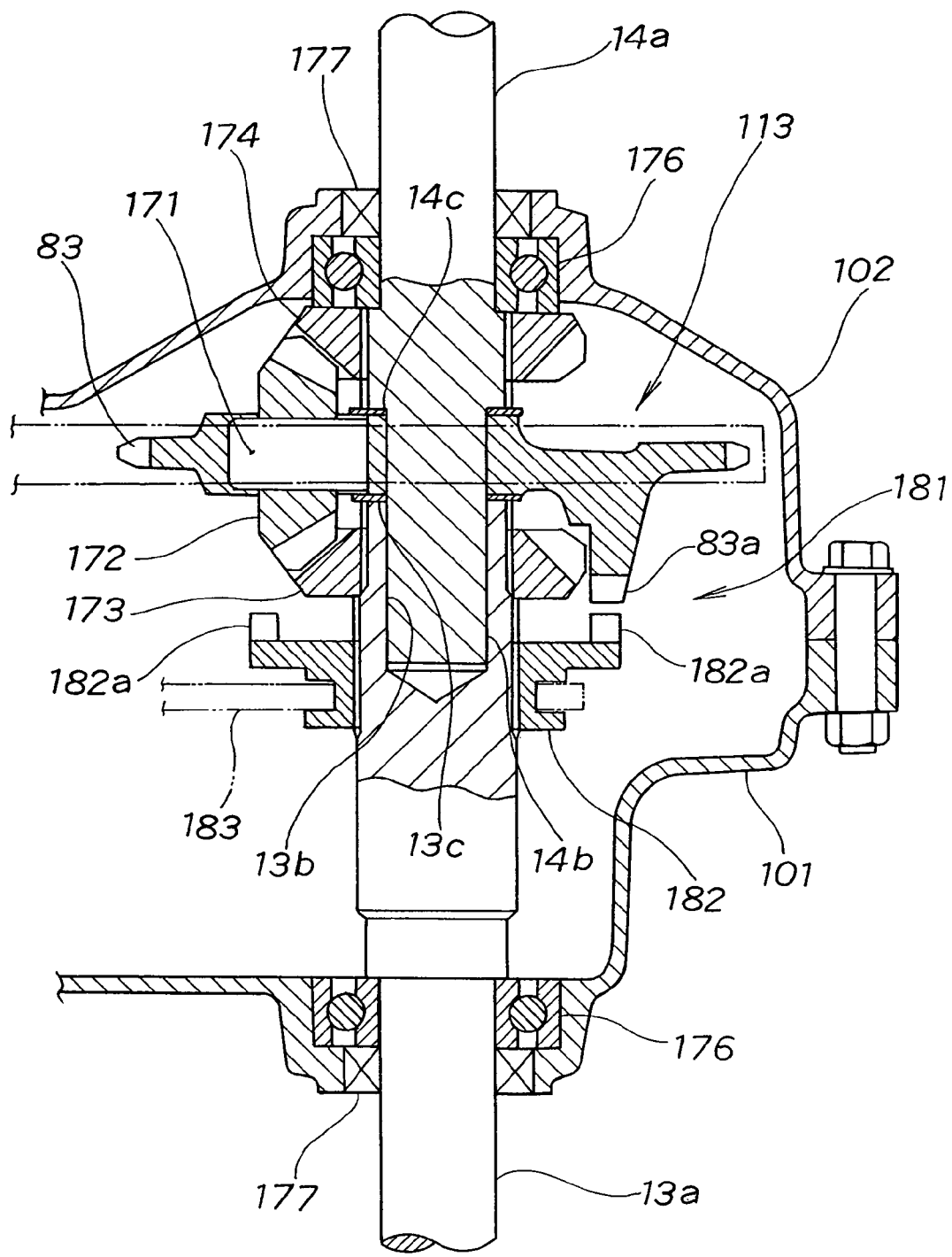
FIG. 10 is an enlarged cross-sectional view of a differential shown in FIG. 6.

FIG. 10 illustrates the differential 113. The differential 113 absorbs rotational difference between the drive wheels 13, 14 (see FIG. 3) when the tiller 10 (see FIG. 3) turns, allowing smooth turning.

The differential 113 includes the third driven sprocket 83, a plurality of support shafts 171 (only one shown in the figure) mounted to the third driven sprocket 83 in a radially extending manner, a plurality of small differential bevel gears 172 (only one shown in the figure) rotatably mounted on the support shafts 171, a left large differential bevel gear 173 engaging the small differential bevel gears 172 and spline-coupled to the left axle 13a, and a right large differential bevel gear 174 engaging the small differential bevel gears 172 and spline-coupled to the right axle 14a.

The left axle 13a and the right axle 14a are rotatably supported by the left case 101 and the right case 102 via bearings 176, 176. Reference numerals 177, 177 denote dust seals.

The left axle 13a has a fitting hollow 13b in its end. The right axle 14a has a fitting protrusion 14b at its end. The fitting protrusion 14b is rotatably fitted into the fitting hollow 13b via the third driven sprocket 83 for connection between the left axle 13a and the right axle 14a.

Reference numerals 13c and 14c denote bushes provided between the third driven sprocket 83 and the axles 13a, 14a.

A differential lock mechanism 181 stops the function of the differential 113 to unitedly rotate the left axle 13a and the right axle 14a.

The differential lock mechanism 181 includes a lock member 182 spline-coupled to the left axle 13a, a slider 183 for axially sliding the lock member 182, the differential lock lever 37 shown in FIG. 3, and a cable (not shown) connecting the slider 183 to the differential lock lever 37.

Operation of the differential lock lever 37 causes the lock member 182 to slide. Claws 182a, 182a of the lock member 182 are engageable with a laterally protruding portion 83a formed on the third driven sprocket 83 thereby causing the left axle 13a and the third driven sprocket 83 to rotate together. That is, the left axle 13a and the right axle 14a rotate as a unit.

Figure 11:
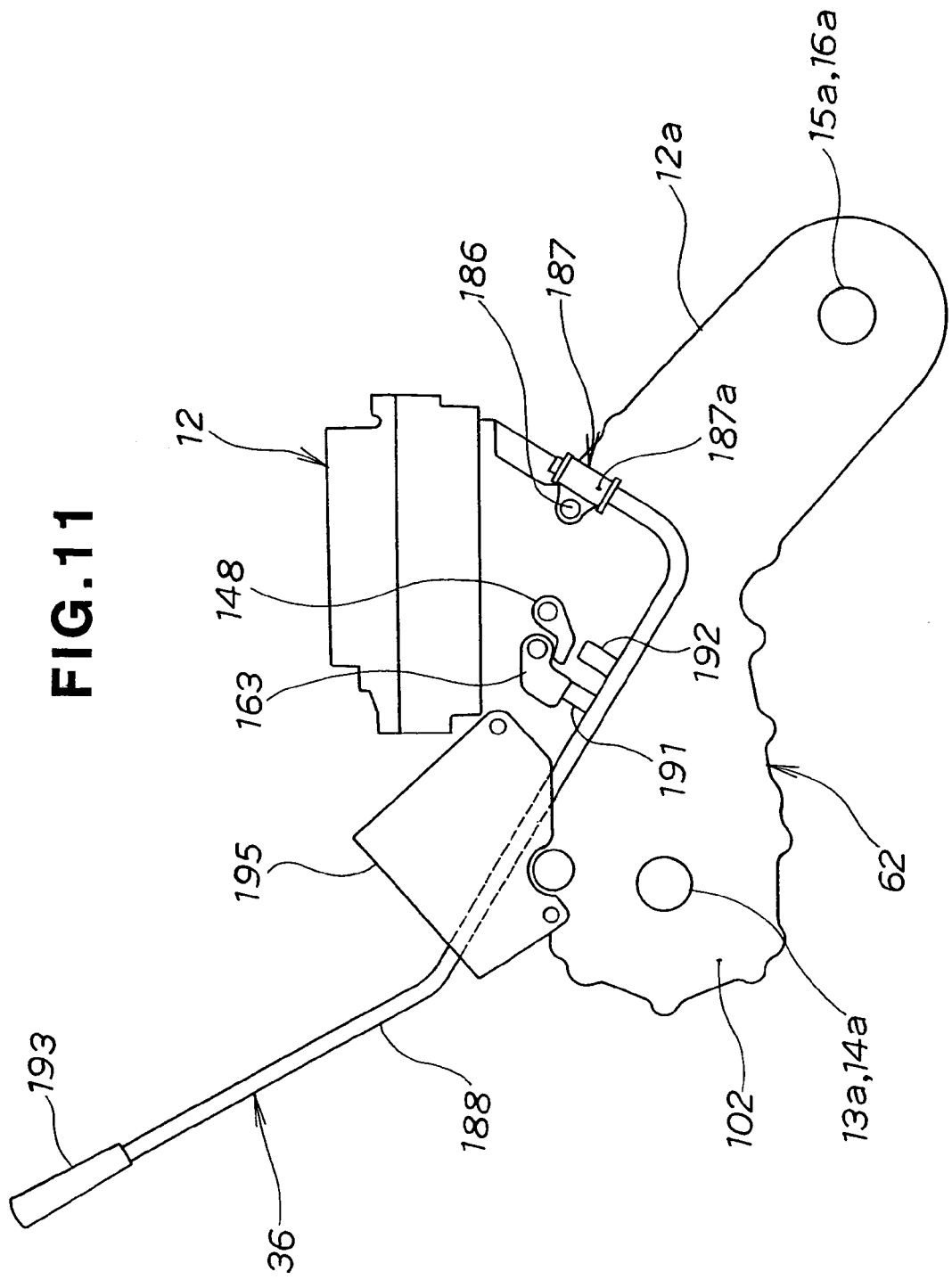
FIG. 11 is a side view of a shift lever mounted to the transmission case.

FIG. 11 illustrates the shift lever 36 mounted to the right case 102 of the transmission case 12a.

The shift lever 36 is a substantially L-shaped member including a base member 187 swingably mounted on a support shaft 186 provided at the right case 102, a lever body 188 swingably attached at its distal end to a tube 187a provided at the base member 187, a first protrusion 191 and a second protrusion 192 protruded upward from an intermediate portion of the lever body 188, and a grip 193 attached to the proximal end of the lever body 188.

The lever body 188 passes through a shift guide panel 195 mounted on the transmission case 12a.

FIG. 12 partly illustrates the shift lever 36 in an enlarged view.

The first protrusion 191 of the shift lever 36 is opposite to the drive arm member 163 of the drive shift member 157.

The second protrusion 192 is opposite to the working arm member 148 of the working shift member 145.

FIG. 12 illustrates the position of the shift lever 36 when the transmission 111 (see FIG. 7) is in drive neutral. Specifically, the first protrusion 191 is engaged with the engaged hollow 163a of the drive arm member 163, and the second protrusion 192 is not engaged with the engaged hollow 148a of the working arm member 148. The working fork member 147 and the drive fork member 162 are shown in broken lines.

Figure 13A:
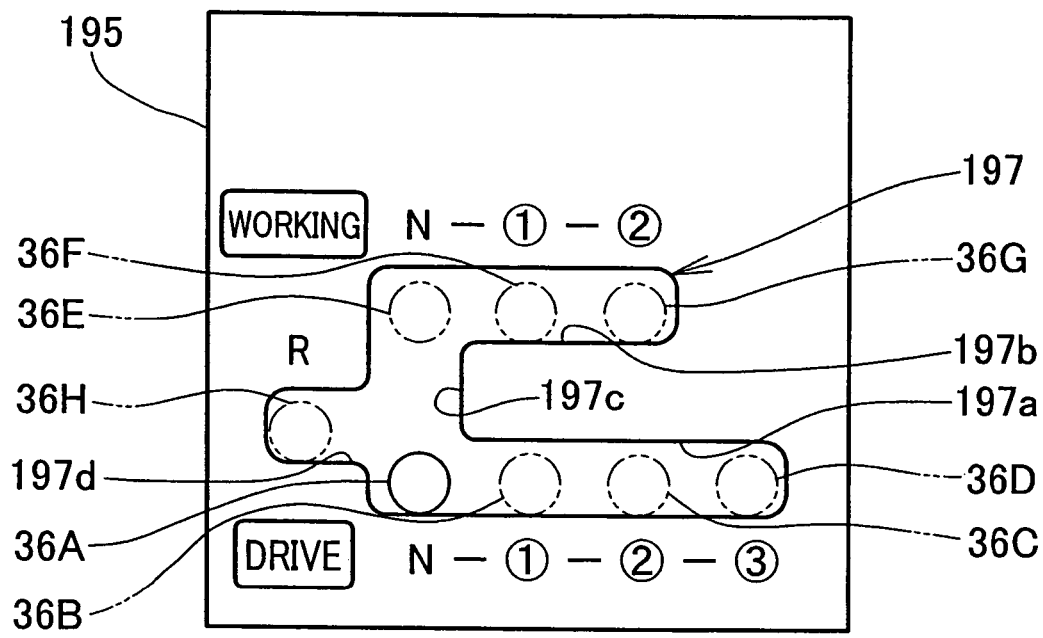
FIGS. 13A and 13B are diagrams showing shift patterns of the shift lever in an embodiment of the present invention and in a comparative example.
Figure 13B:
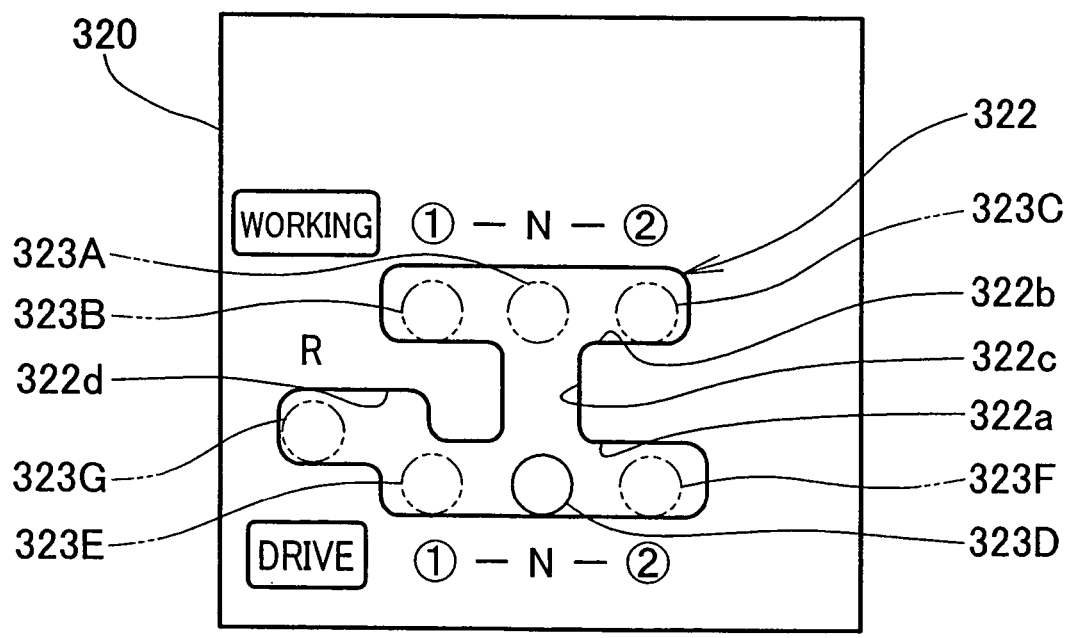

FIGS. 13A and 13B illustrate shift patterns of the shift lever 36 in this embodiment and in a comparative example.

In the embodiment shown in FIG. 13A, the shift guide panel 195 has a guide hole 197 for guiding the shift lever 36 (see FIG. 12).

The guide hole 197 has a drive slot 197a, a working slot 197b provided in parallel with the drive slot 197a, a connecting hole 197c connecting the drive slot 197a and the working slot 197b at their respective ends, and a lateral hole 197d laterally protruded from the connecting hole 197c.

The drive slot 197a allows the shift lever 36 to be moved to a drive neutral position 36A (position N in the drive slot), a first forward gear position 36B (position ① in the drive slot), a second forward gear position 36c (position ② in the drive slot) and a third forward gear position 36D (position ③ in the drive slot) for propelling the tiller 10, which are sequential from the left.

The working slot 197b allows the shift lever 36 to be moved to a working neutral position 36E (position N in the working slot), a working first gear position 36F (position 1 in the working slot) and a working second gear position 36G (position 2 in the working slot), which are sequential from the left.

The working first gear position 36F is for forward travel in first gear while operating the tilling devices 15, 16 (see FIG. 1). The working second gear position 36G is for forward travel in second gear while operating the tilling devices 15, 16.

The lateral hole 197d receives the shift lever 36 to a reverse position 36H for moving the tiller 10 backward.

In this manner, the shift pattern in this embodiment allows gradual increase of speed from the neutral positions 36A, 36E for driving and working, facilitating intuitive recognition of the shift pattern, and facilitating shift control.

In the comparative example in FIG. 13B, the shift guide panel 320 has a guide hole 322 for guiding the shift lever 36.

The guide hole 322 has a drive slot 322a, a working slot 322b provided in parallel with the drive slot 322a, a connecting hole 322c connecting middle portions of the drive slot 322a and the working slot 322b, and a lateral hole 322d laterally extended from an end of the drive slot 322a, being offset toward the working slot 322b.

As for the position of the shift lever 36, reference sign 323A denotes a working neutral position, 323B a working first forward gear position, 323C a working second forward gear position, 323D a drive neutral position, 323E a drive first gear position, 323F a drive second gear position, and 323G a reverse position.

In the shift pattern in this comparative example, the neutral positions 323A and 323D for driving and working are positioned between first gear and second gear. It is necessary to shift the lever 36 through the neutral positions 323A and 323D to shift from first gear to second gear or from second gear to first gear, resulting in poor operability as compared with the shift pattern in the embodiment shown in FIG. 13A.

Figure 14:
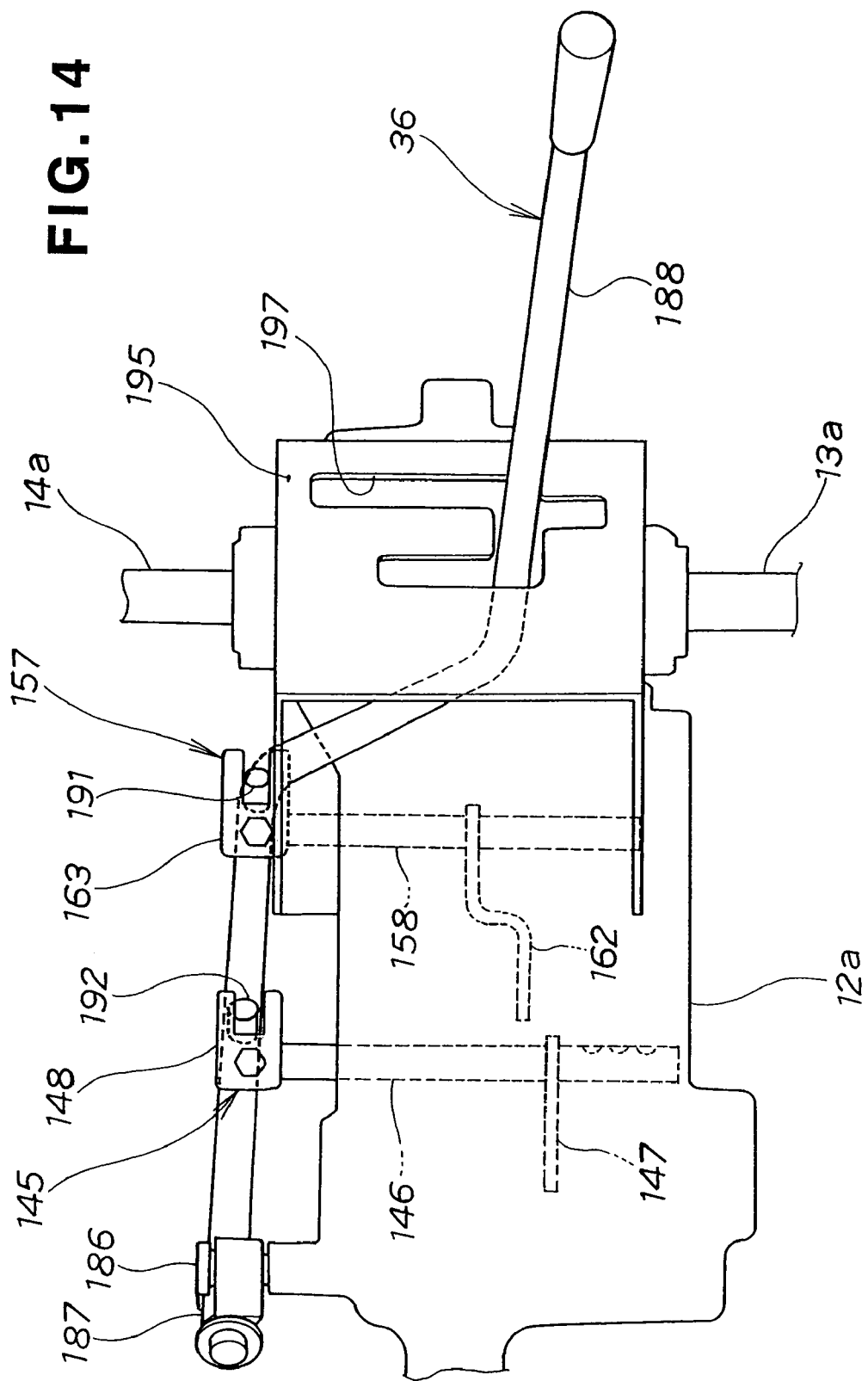
FIG. 14 is plan view of the transmission case having the shift lever.

FIG. 14 illustrates the relationship between the shift lever 36, drive arm member 163 and working arm member 148.

Specifically, it is shown that the shift lever 36 is located in the drive neutral position 36A (see FIG. 13A), the first protrusion 191 of the shift lever 36 is engaged with the drive arm member 163 of the drive shift member 157, and the second protrusion 192 is not engaged with the working arm member 148 of the working shift member 145.

The function of the above-described transmission 111 will be described below.

FIGS. 15A, 15B and 15C illustrate the working of the drive transmission mechanism 123.

Referring to FIG. 15A, the shift lever 36 is moved from the drive neutral position 36A to the first forward gear position 36B.

At that time, as shown in FIG. 15B, the first protrusion 191 is engaged with the drive arm member 163 and the second protrusion 192 is not engaged with the working arm member 148. Swinging the lever body 188 toward the front of the figure sheet about the tube 187a to move the shift lever 36 as shown in FIG. 15A causes the first protrusion 191 to move, with which the drive shift rod 158 slides outward, that is, in the direction of an arrow as shown in FIG. 15C.

As a result, the drive fork member 162 causes, via the annular member 161, the engaging claw 138a of the sliding key 138 to move from within the engaged hollow 137a of the neutral positioning ring 137 to the engaged groove 133a of the first driven gear 133. The first driven gear 133 and the drive shaft 78 are allowed to rotate together, transmitting power from the first drive gear 67c (see FIG. 7) to the drive shaft 78.

Similarly, as in FIGS. 15A and 15C, movement of the shift lever 36 from the first forward gear position 36B to the second forward gear position 36C causes the sliding key 138 to connect the second driven gear 134 and the drive shaft 78. Power is transmitted from the second drive gear 131 (see FIG. 7) to the drive shaft 78. Movement of the shift lever 36 from the second forward gear position 36C to the third forward gear position 36D causes the sliding key 138 to connect the third driven gear 136 and the drive shaft 78. Power is transmitted from the third drive gear 132 (see FIG. 7) to the drive shaft 78.

Figure 16C:
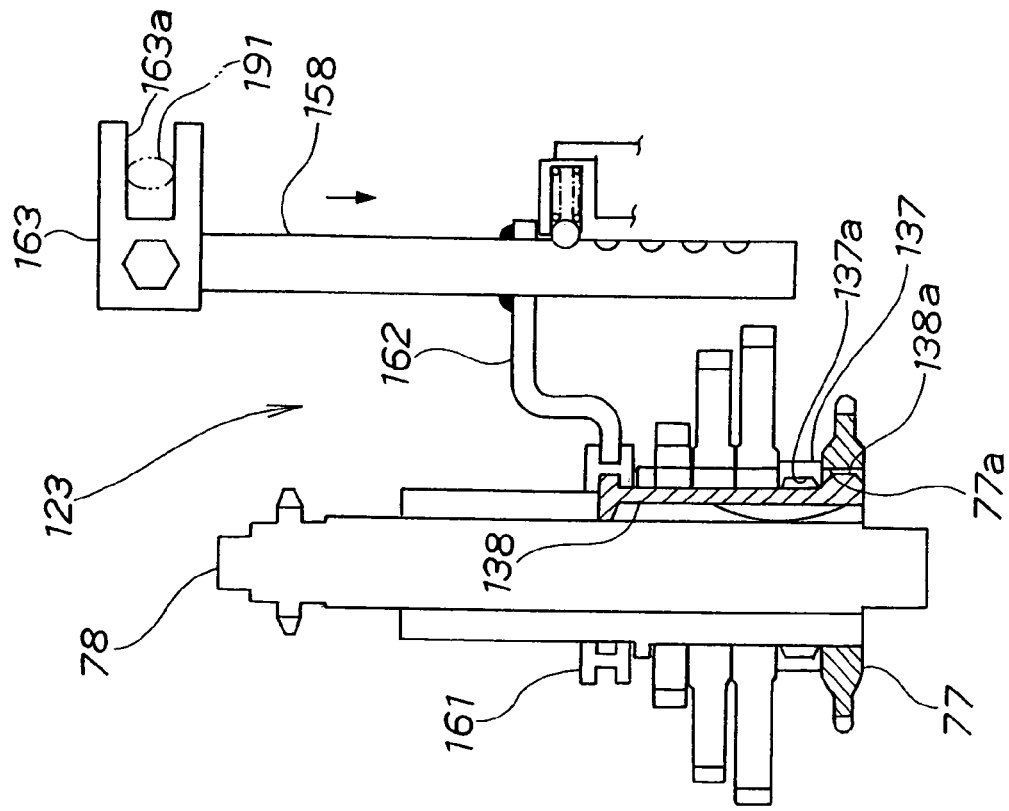
FIGS. 16A, 16B and 16C are diagrams illustrating the working of the drive transmission mechanism when the shift lever is moved from the drive neutral position to a reverse position.
Figure 16A:
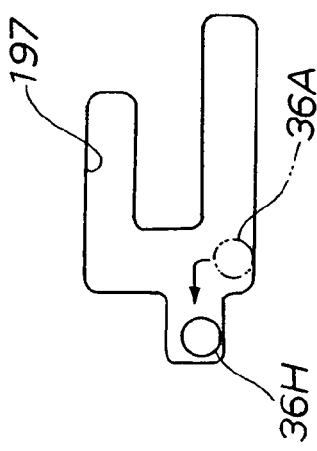
Figure 16B:
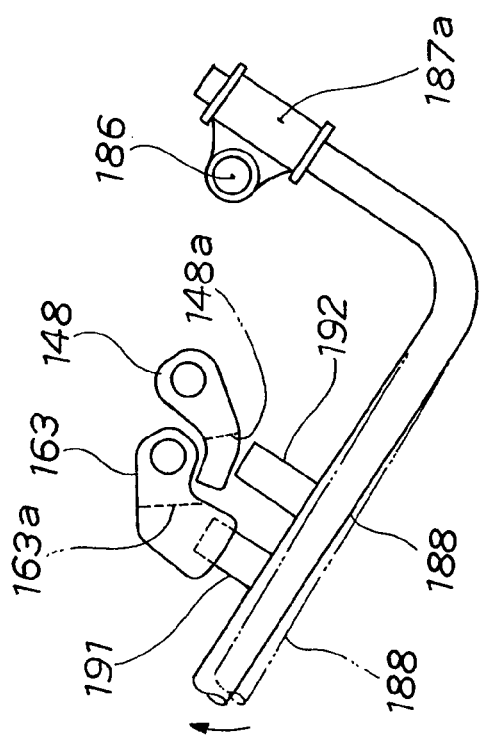

FIGS. 16A, 16B and 16C illustrate the state in which the shift lever 36 is moved to the reverse position 36H.

Referring to FIG. 16A, the shift lever 36 is moved from the drive neutral position 36A to the reverse position 36H.

At that time, as shown in FIG. 16B, the lever body 188 is slightly swung in the direction of an arrow about the support shaft 186. The first protrusion 191 is in engagement with the drive arm member 163 and the second protrusion 192 is not engaged with the working arm member 18. The lever body 188 is swung toward the back of the figure sheet about the tube 187a to move the shift lever 36 as shown in FIG. 16A. As shown in FIG. 16C, with the movement of the first protrusion 191, the drive shift rod 158 slides in the direction of an arrow.

As a result, the drive fork member 162 causes, via the annular member 161, the engaging claw 138a of the sliding key 138 to move from within the engaged hollow 137a of the neutral positioning ring 137 to the engaged groove 77a of the second driven sprocket 77. The second driven sprocket 77 and the drive shaft 78 are allowed to rotate together, transmitting power from the second drive sprocket 71 (see FIG. 4) to the drive shaft 78. At that time, the drive shaft 78 rotates in a direction opposite to that as described with FIG. 15C.

FIGS. 17A, 17B and 17C illustrate the working of the working transmission mechanism 122.

Referring to FIG. 17A, the shift lever 36 is moved from the drive neutral position 36A through the working neutral position 36E to the working first gear position 36F.

At that time, as shown in FIG. 17B, the lever body 188 is swung in the direction of an arrow about the support shaft 186. The first protrusion 191 is engaged with the drive arm member 163 and the second protrusion 192 is also engaged with the working arm member 148.

The lever body 188 is swung toward the front of the figure sheet about the tube 187a to move the shift lever 36 as shown in FIG. 17A. With the movement of the second protrusion 192, the working shift rod 146 slides outward, that is, in the direction of an arrow as shown in FIG. 17C. At that time, the drive shift rod 158 shown in FIG. 15C also slides.

The coupling sleeve 127 is moved with the working fork member 147 to engage with the gear 68a of the first drive sprocket 68. The working shaft 67 and the first drive sprocket 68 rotate together, transmitting power from the working shaft 67 via the first chain 72 (see FIG. 4) to the auxiliary tilling shaft 74 (see FIG. 4).

In a similar manner, as in FIGS. 17A and 17C, when the shift lever 36 moves from the working first gear position 36F to the working second gear position 36G, the working fork member 147 moves to a position shown by imaginary lines, causing the coupling sleeve 127 to further slide, maintaining the engagement with the gear 68a.

When the shift lever 36 is in the working first gear position 36F, the tiller 10 can travel forward in first gear with the tilling devices 15, 16 (see FIG. 1) operated. When the shift lever 36 is in the working second gear position 36G, the tiller 10 can travel forward in second gear with the tilling devices 15, 16 operated.

Now, a transmission according to a second embodiment of the present invention will be described with reference to FIGS. 18 to 26A to 26F. In the description of the second embodiment, members identical with those of the transmission 111 in the first embodiment are given the same reference numerals and will not be described.

FIG. 18 corresponds to FIG. 6 of the first embodiment, illustrating a drive unit 12 according to the second embodiment in which a working transmission mechanism 122 includes a clutch mechanism 124. The other components are identical with those in the first embodiment.

Figure 19:
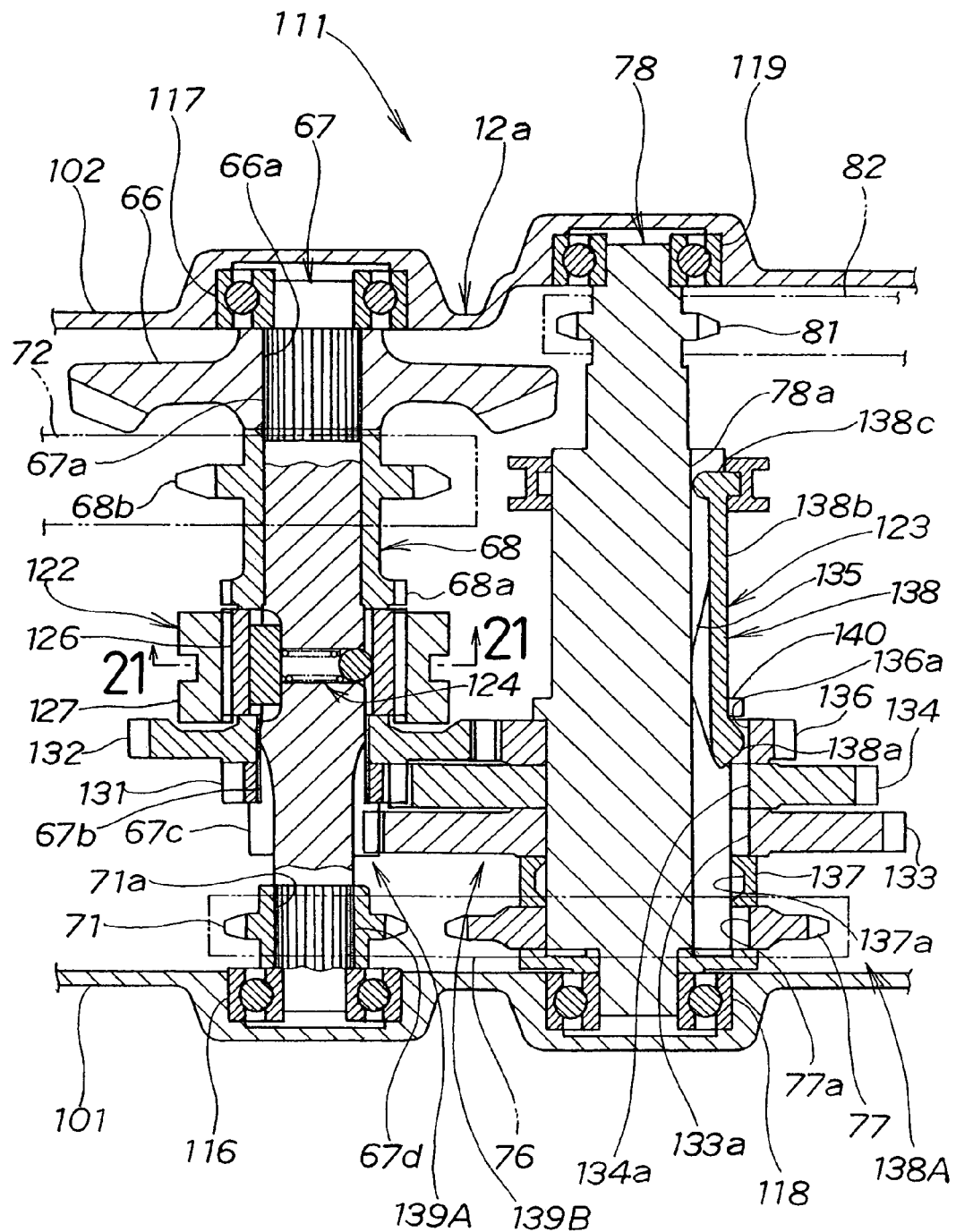
FIG. 19 is an enlarged cross-sectional view of a transmission shown in FIG. 18.

FIG. 19 illustrates a transmission 111 according to the second embodiment of this invention. The working transmission mechanism 122 of a constant-mesh transmission mechanism includes the clutch mechanism 124 for smooth engagement with a first drive sprocket 68. The clutch mechanism 124 engages an input gear 126. The other components of the transmission 111 in the second embodiment are identical with those in the first embodiment shown in FIG. 7.

Figure 20:
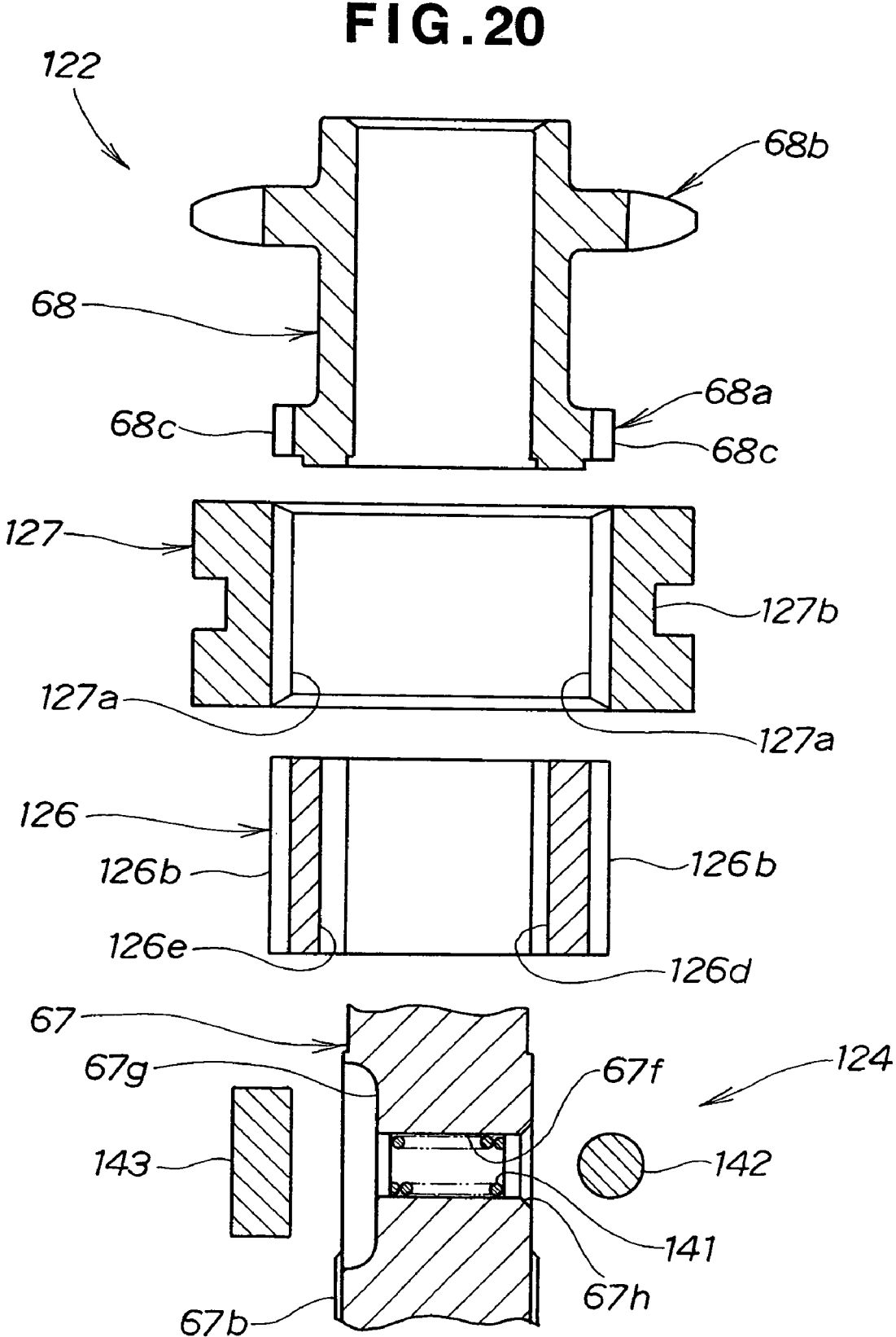
FIG. 20 is a cross-sectional view of a working transmission mechanism shown in FIG. 19.

FIG. 20 illustrates the first drive sprocket 68, a coupling sleeve 127, the input gear 126 and the clutch mechanism 124 which constitute the working transmission mechanism 122 according to the second embodiment shown in FIG. 19.

The input gear 126 is fitted on a working shaft 67. The clutch mechanism 124 restricts the rotation of the input gear 126 with respect to the working shaft 67. Teeth 126b formed on the input gear 126 engage with teeth 127a formed in the coupling sleeve 127. Axial sliding of the coupling sleeve 127 causes the teeth 127a of the coupling sleeve 127 to engage with teeth 68c of a gear 68a of the first drive sprocket 68.

That is, the clutch mechanism 142 transmits torque of the working shaft 67 to the first drive sprocket 68 or cuts off.

The clutch mechanism 124 consists of a through hole 67f, a shaft recess 67g, a spring (biasing member) 141, a ball (protruding member) 142, a cylindrical member (engaging member) 143, a first groove (cam) 126d, and a second groove (recess) 126e.

The hole 67f is formed in the working shaft 67 orthogonally to the axis of the working shaft 67. The shaft recess 67g is formed at one opening of the hole 67f. The spring 141 is inserted in the hole 67f. The ball 142 is abutted on one end of the spring 141 to protrude from or retract into the hole 67f.

The cylindrical member 143 contacts the other end of the spring 141, disposed in the shaft recess 67g.

The first groove 126d is formed in the input gear 126 to partly hold the ball 142 when the input gear 126 is fitted on the working shaft 67.

The second groove 126e is formed in the input gear 126 to partly hold the cylindrical member 143.

Reference numeral 67h denotes a chamfer formed at the other opening of the hole 67f.

When the coupling sleeve 127 is connected to the first drive sprocket 68, the teeth 127a of the coupling sleeve 127 smoothly mesh with the teeth 68c of the first drive sprocket 68a because the coupling sleeve 127 and the first drive sprocket 68 are on the same working shaft 67, hardly causing noise and tooth wear or breakage.

Figure 21:
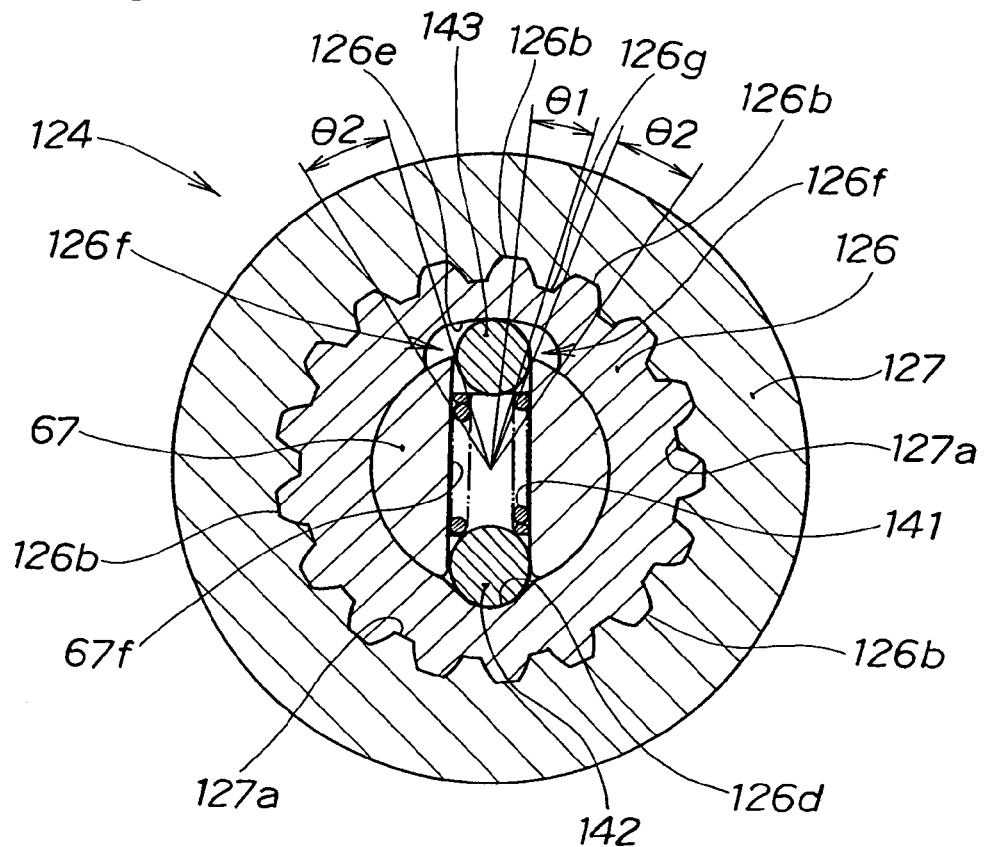
FIG. 21 is a cross-sectional view taken along line 21—21 in FIG. 19.

FIG. 21 illustrates the clutch mechanism 124 in section. For convenience of explanation, the cylindrical member 143 is disposed above and the ball 142 is disposed below in the figure.

The ball 142 is pressed against the bottom of the first groove 126d by the spring 141. The cylindrical member 143 is pressed against the bottom of the second groove 126e by the spring 141.

The second groove 126e is formed with clearances 126f, 126f which allow movement of the cylindrical member 143 in the circumferential direction of the input gear 126 when the working shaft 67 rotates with respect to the input gear 126.

θ1 in the figure is an angle formed by the top center of a tooth 126b of the input gear 126 and the center of a bottom 126g formed between adjacent teeth 126b. θ2 is an angle through which the cylindrical member 143 can circumferentially move. The relationship between θ1 and θ2 is θ2>θ1.

Figure 22:
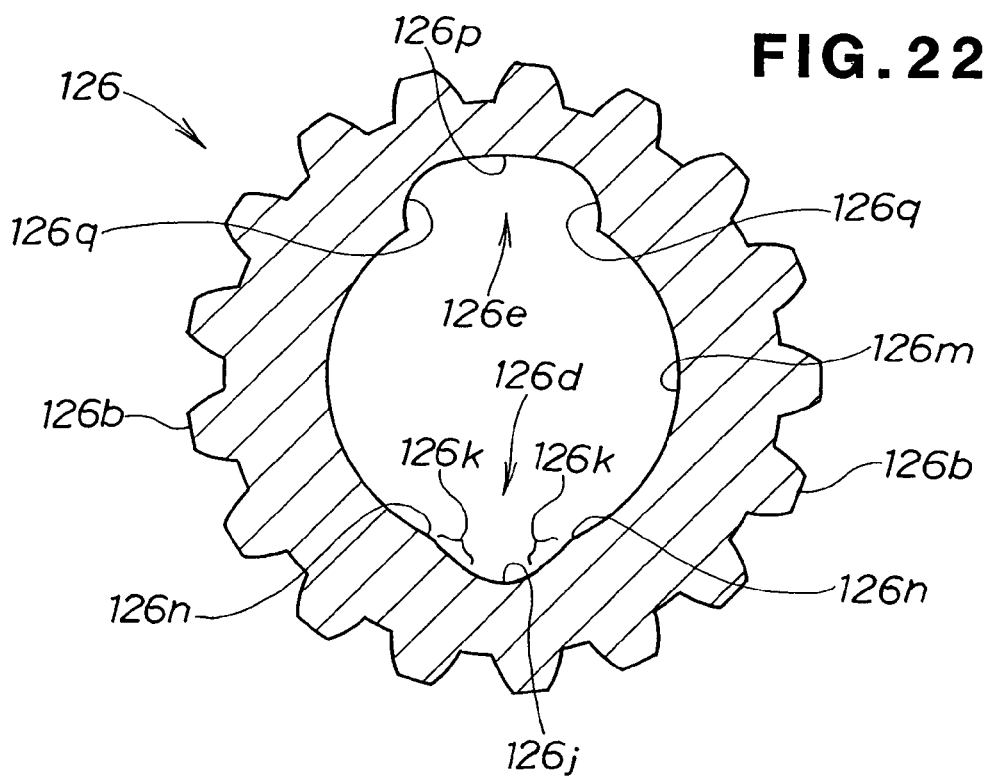
FIG. 22 is a cross-sectional view of an input gear shown in FIG. 21.

FIG. 22 illustrates the input gear 126 shown in FIG. 21.

The first groove 126d consists of a circular bottom (depression) 126j, linear portions 126k, 126k linearly inclined from the opposite sides of the circular bottom 126j to an inside peripheral surface 126m of the input gear 126 (a portion fitted onto the working shaft 67), and circular end portions 126n, 126n connecting ends of the linear portions 126k, 126k to the inside peripheral surface 126m.

The second groove 126e consists of a circular bottom 126p and circular edge portions 126q, 126q formed in an arc from the opposite sides of the circular bottom 126p to the inside peripheral surface 126m. When the cylindrical member 143 (see FIG. 21) comes into contact with either of the circular edge portions 126q, the periphery of the cylindrical member 143 contacts the almost entire circular edge portion 126q.

Figure 23B:
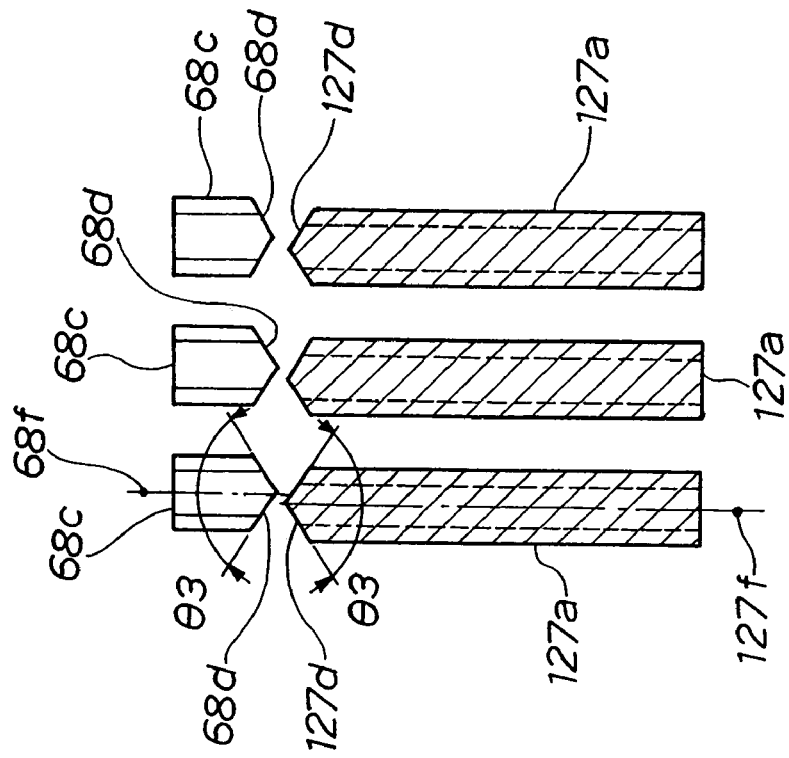
FIGS. 23A and 23B are diagrams illustrating the relationship between teeth of a first drive sprocket and teeth of a coupling sleeve shown in FIG. 20.
Figure 23A:
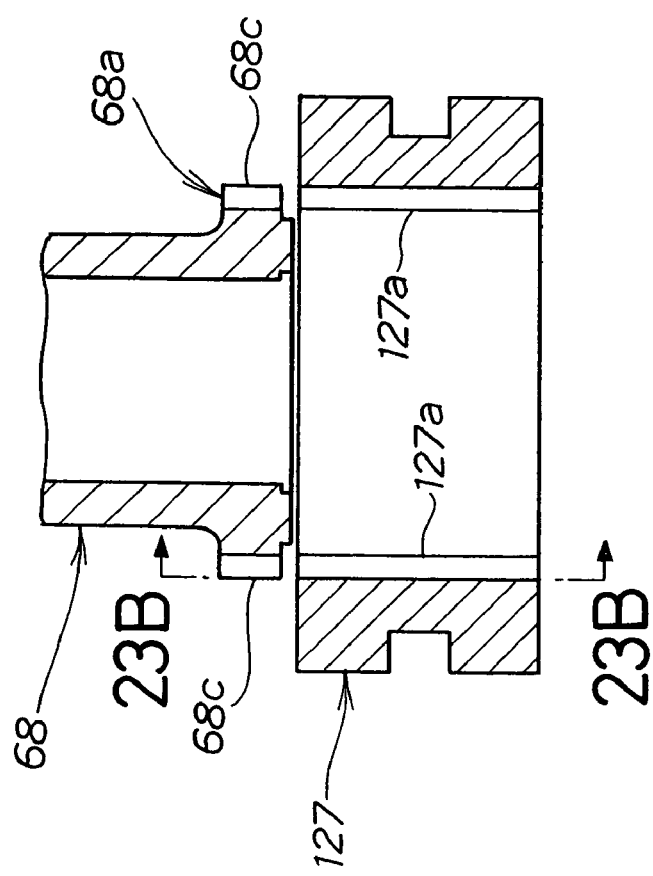

FIGS. 23A and 23B illustrate the relationship between the teeth 127a of the coupling sleeve 127 and the teeth 68c of the first drive sprocket 68 shown in FIG. 20.

FIG. 23A illustrates the coupling sleeve 127 and the first drive sprocket 68 adjacent to one another.

As shown in FIG. 23B, a reverse V-shaped taper 127d is formed at one end of each tooth 127a of the coupling sleeve 127, and a reverse V-shaped taper 68d is formed at one end of each tooth 68c of the first drive sprocket 68, opposite to the taper 127d.

The taper 127d is symmetrical with respect to the center line 127f of the tooth 127a. The taper 127d has an angle of θ3.

The taper 68d is symmetrical with respect to the center line 68f of the tooth 68c. The taper 68d has an angle of θ3.

The center line 127f of the tooth 127a of the coupling sleeve 127 is slightly off the center line 68f of the tooth 68c of the first drive sprocket 68 to facilitate engagement between the teeth 127a and 68c.

Figure 24A:
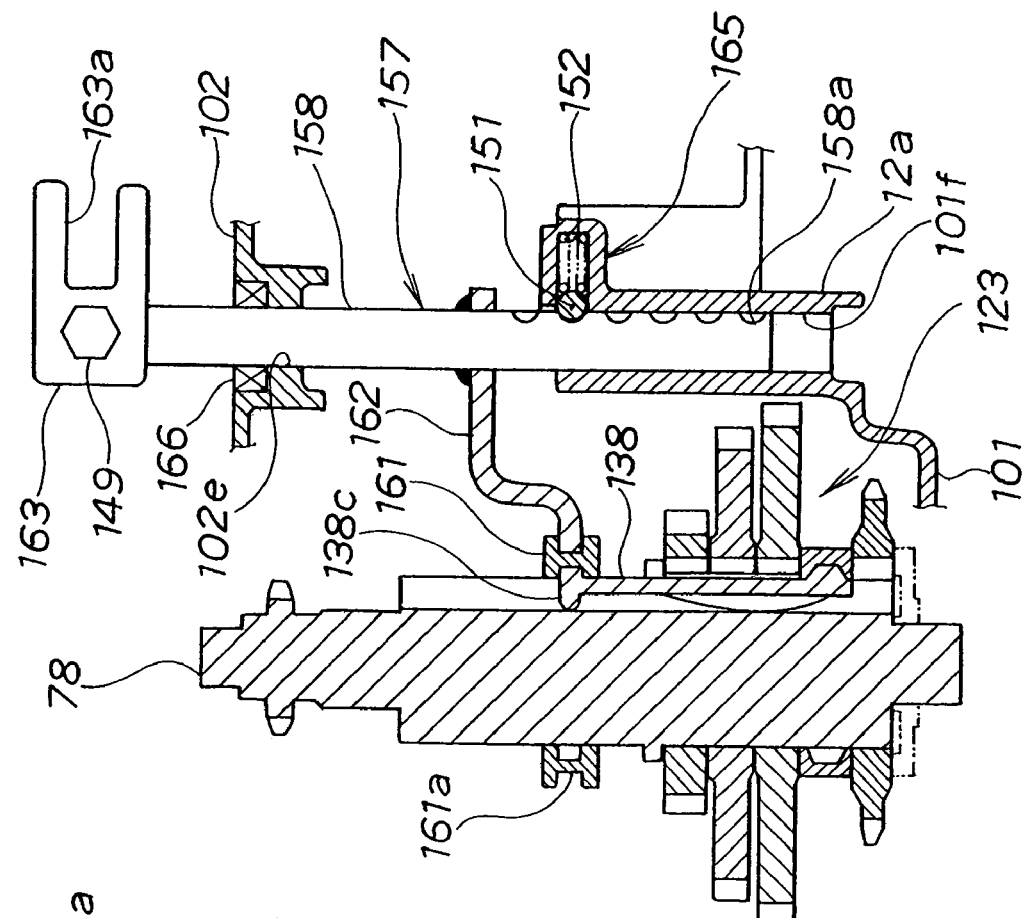
FIGS. 24A and 24B are cross-sectional views of the working transmission mechanism provided with a working shift member and a drive transmission mechanism provided with a drive shift member according to the second embodiment.
Figure 24B:
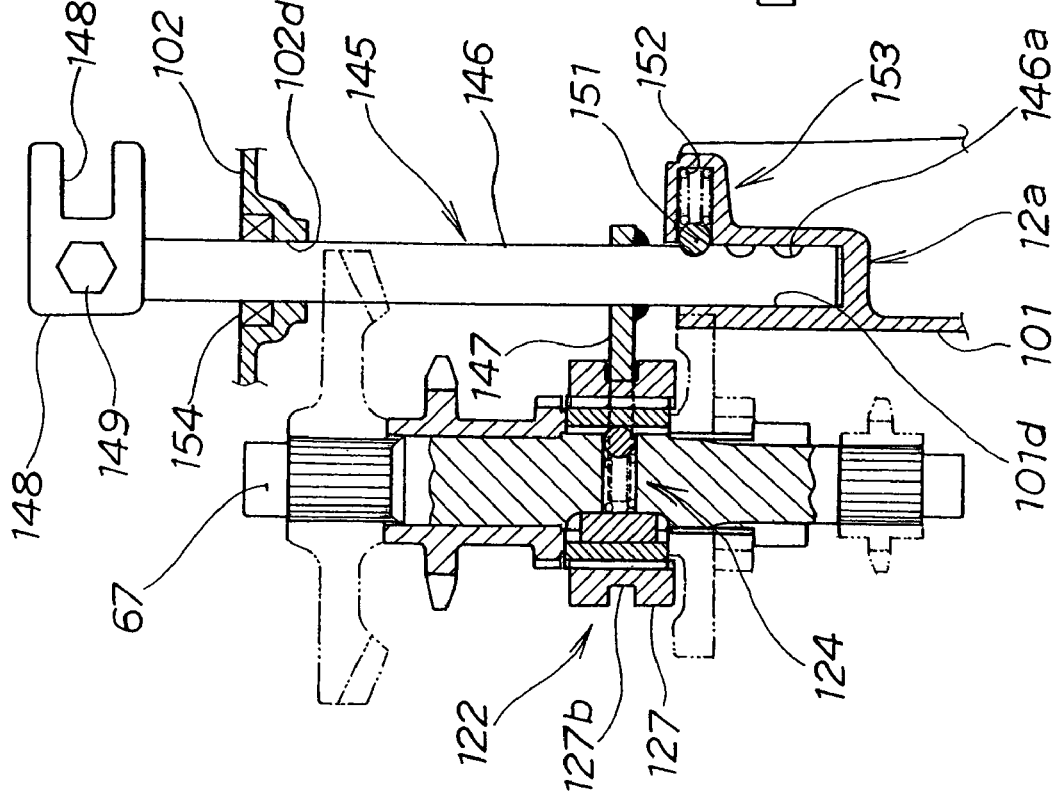

FIGS. 24A and 24B illustrate an example in which a working shift member 145 is provided to the working transmission mechanism 122 and a drive shift member 157 is provided to a drive transmission mechanism 123 in the transmission 111 according to the second embodiment. The example differs from the first embodiment shown in FIGS. 9A and 9B only in that the working transmission mechanism 122 includes the clutch mechanism 124. The other components are given the same reference numerals as used in FIGS. 9A and 9B and will not be described.

Figure 25C:
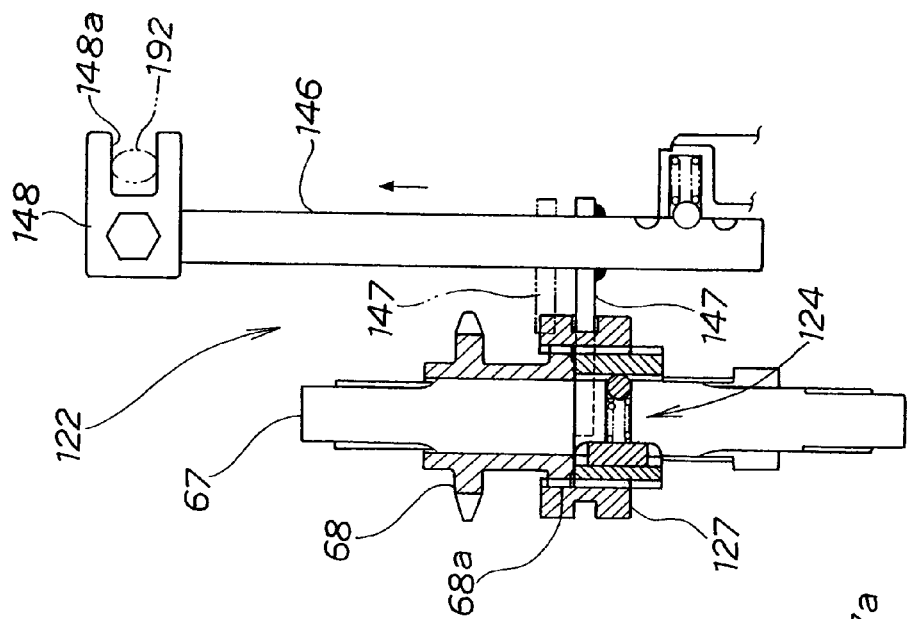
FIGS. 25A, 25B and 25C are diagrams illustrating the working of the working transmission mechanism when a shift lever is moved from a drive neutral position through a working neutral position to a working first gear position.
Figure 25A:
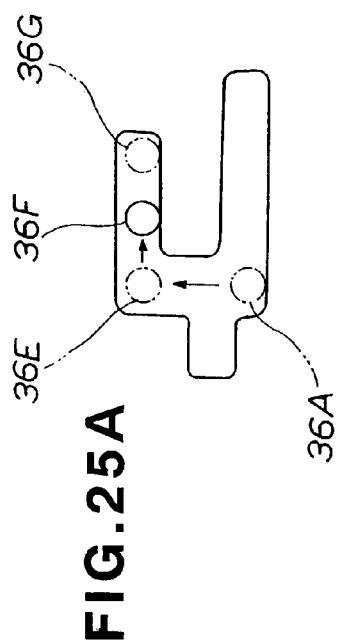
Figure 25B:
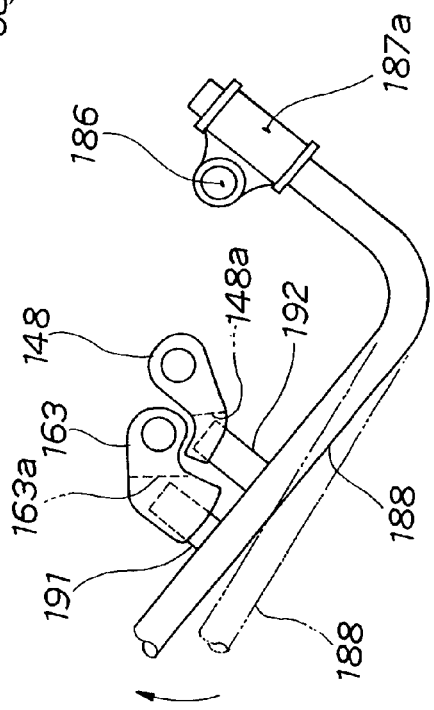

FIGS. 25A, 25B and 25C illustrate the working of the working transmission mechanism 122 according to the second embodiment. The driving transmission mechanism 123 and reverse travel operation are the same as described in the first embodiment with FIGS. 15A to 15C and 16A to 16C. Only the operation of the working transmission mechanism 122 will now be described.

Referring to FIG. 25A, a shift lever 36 is moved from a drive neutral position 36A through a working neutral position 36E to a working first gear position 36F.

At that time, as shown in FIG. 25B, a lever body 188 is swung about a support shaft 186 in the direction of an arrow. This causes a first protrusion 191 to engage with a drive arm member 163 and also causes a second protrusion 192 to engage with a working arm member 148.

Swinging the lever body 188 about a tube 187a toward the front of the figure sheet to move the shift lever 36 as shown in FIG. 25A causes the second protrusion 192 to move, with which a working shift rod 146 slides outward, that is, in the direction of an arrow as shown in FIG. 25C. At that time, a drive shift rod 158 shown in FIG. 15C also slides.

The coupling sleeve 127 is moved with a working fork member 147 to engage with the gear 68a of the first drive sprocket 68. The working shaft 67 and the first drive sprocket 68 come to rotate unitedly via the clutch mechanism 124, transmitting power from the working shaft 67 via a first chain 72 (see FIG. 4) to an auxiliary tilling shaft 74 (see FIG. 4).

Similarly, as shown in FIGS. 25A to 25C, when the shift lever 36 moves from the working first gear position 36F to a working second gear position 36G, the working fork member 147 moves to a position shown by imaginary lines, causing the coupling sleeve 127 to further slide, maintaining the engagement with the gear 68a.

Now, the operation of the clutch mechanism 124 according to the second embodiment will be described with reference to FIGS. 26A to 26F.

FIG. 26A illustrates the clutch mechanism 124 before actuation. Specifically, the ball 142 is located on the bottom of the first groove 126d, the cylindrical member 143 is located in the circumferential center of the second groove 126e, and the working shaft 67, input gear 126 and coupling sleeve 127 (see FIG. 21) rotate together. Reference numeral 198 denotes a straight line passing through the top center of a tooth 126A of the input gear. 126 and the rotational center of the input gear 126.

Referring to FIG. 26B, the teeth 127a of the coupling sleeve 127 are pressed against the teeth 68c of the first drive sprocket 68 for shift operation.

The first drive sprocket 68 is, as shown in FIGS. 18 and 19, connected to tilling devices 15, 16 via the first chain 72. A relatively large torque is necessary to start rotation of the first drive sprocket 68. When the teeth 127a of the coupling sleeve 127 do not mesh with the teeth 68c of the first drive sprocket 68 as shown in FIG. 26B, it is required to repeat shift operation several times in a conventional art.

In this embodiment, the teeth 127a of the coupling sleeve 127 are kept pressed against the teeth 68c of the first drive sprocket 68.

Referring to FIG. 26C, the force of pressing the teeth 127a against the teeth 68c causes the tapers 127d of the teeth 127a to slide on the tapers 68d of the teeth 68c, moving the teeth 127a between the teeth 68c, and allowing engagement of the teeth 127a with the teeth 68c.

FIG. 26D illustrates the state in which the teeth 127a shown in FIG. 26C move, that is, the input gear 126 rotates counterclockwise together with the coupling sleeve 127 (see FIG. 21). (φ1 shows the angle of rotation of the input gear 126 from the state shown in FIG. 26A. At that time, the ball 142 gets on the linear portion 126k of the first groove 126d.

FIG. 26E illustrates the state in which the coupling sleeve 127 is further pressed against the first drive sprocket 68 to engage the teeth 127a with the teeth 68c.

FIG. 26F illustrates the state in which the input gear 126 further rotates with respect to the working shaft 67, with the teeth 127a of the coupling sleeve 127 mating with the teeth 68c of the first drive sprocket 68 as shown in FIG. 26E. The cylindrical member 143 of the clutch mechanism 124 abuts on the circular edge portion 126q of the second groove 126e, transmitting power from the working shaft 67 to the input gear 126.

From this state, when no power is transmitted from the working shaft 67 to the input gear 126, the spring 141 causes the ball 142 to move from the linear portion 126k to the circular bottom 126j, returning to the state in FIG. 26A.

In this embodiment, as shown in FIGS. 26B to 26D, the clutch mechanism 124 for allowing circumferential movement of the teeth 127a of the coupling sleeve 127 is provided, that is, the clearances 126f, 126f for allowing movement of the cylindrical member 143 within the second groove 126e are provided so as to facilitate engagement of the teeth 127a of the coupling sleeve 127 with the teeth 68c of the first drive sprocket 68 even from positions shown in FIG. 26B in which the teeth 127a and the teeth 68c are not in mesh at shift operation.

FIGS. 27A to 27C illustrate a clutch mechanism according to a third embodiment of the present invention. Components identical to those in the second embodiment shown in FIGS. 21 and 22 are given the same reference numerals and will not be described.

A clutch mechanism 210 of the embodiment shown in FIG. 27A consists of an opening hole 67f and a shaft recess 67g in a working shaft 67, a spring 141, a ball 142, a key (engaging member) 211 disposed in the shaft recess 67g, abutted on an end of the spring 141, a first groove 126d formed in the inside peripheral surface of an input gear 212 in engagement with a coupling sleeve 127 (see FIG. 21), and a second groove (recess) 213 formed in the inside peripheral surface of the input gear 212 for partly holding the key 211.

Reference numerals 215, 215 denote clearances which allow the key 211 to move circumferentially within the second groove 213.

FIG. 27B illustrates the state in which teeth 127a of the coupling sleeve 127 move into teeth 68c of a first drive sprocket 68 as shown in FIG. 26C. That is, FIG. 27B shows the counterclockwise rotation of the input gear 212 with respect to the working shaft 67.

As shown in FIG. 27C, with the teeth 127a of the coupling sleeve 127 engaging with the teeth 68c of the first drive sprocket 68 as shown in FIG. 26E, the key 211 abuts on an edge of the second groove 213, transmitting power from the working shaft 67 to the input gear 212.

Figure 28A:
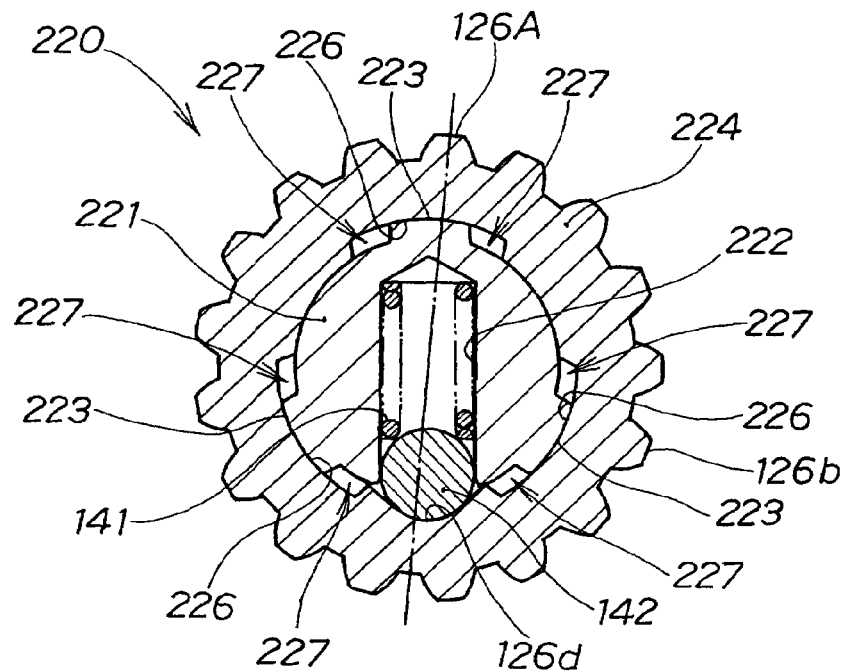
FIGS. 28A to 28C are diagrams illustrating the configuration and working of a clutch mechanism according to a fourth embodiment of the present invention.
Figure 28B:
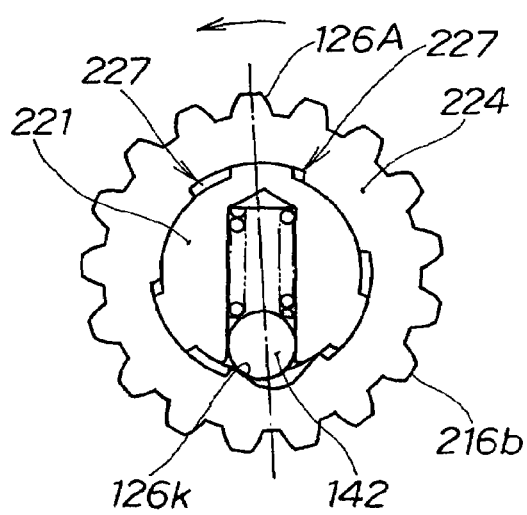
Figure 28C:
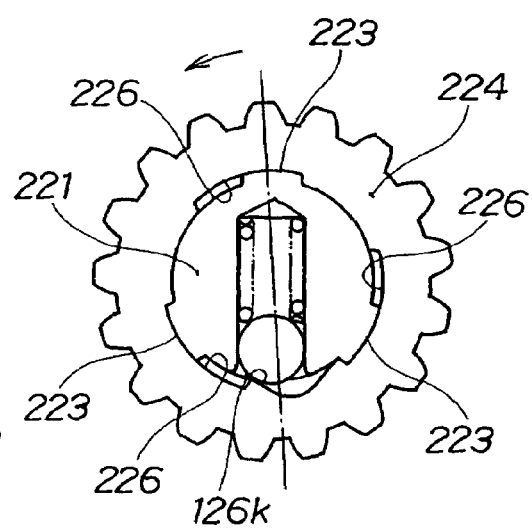
Figure 29:
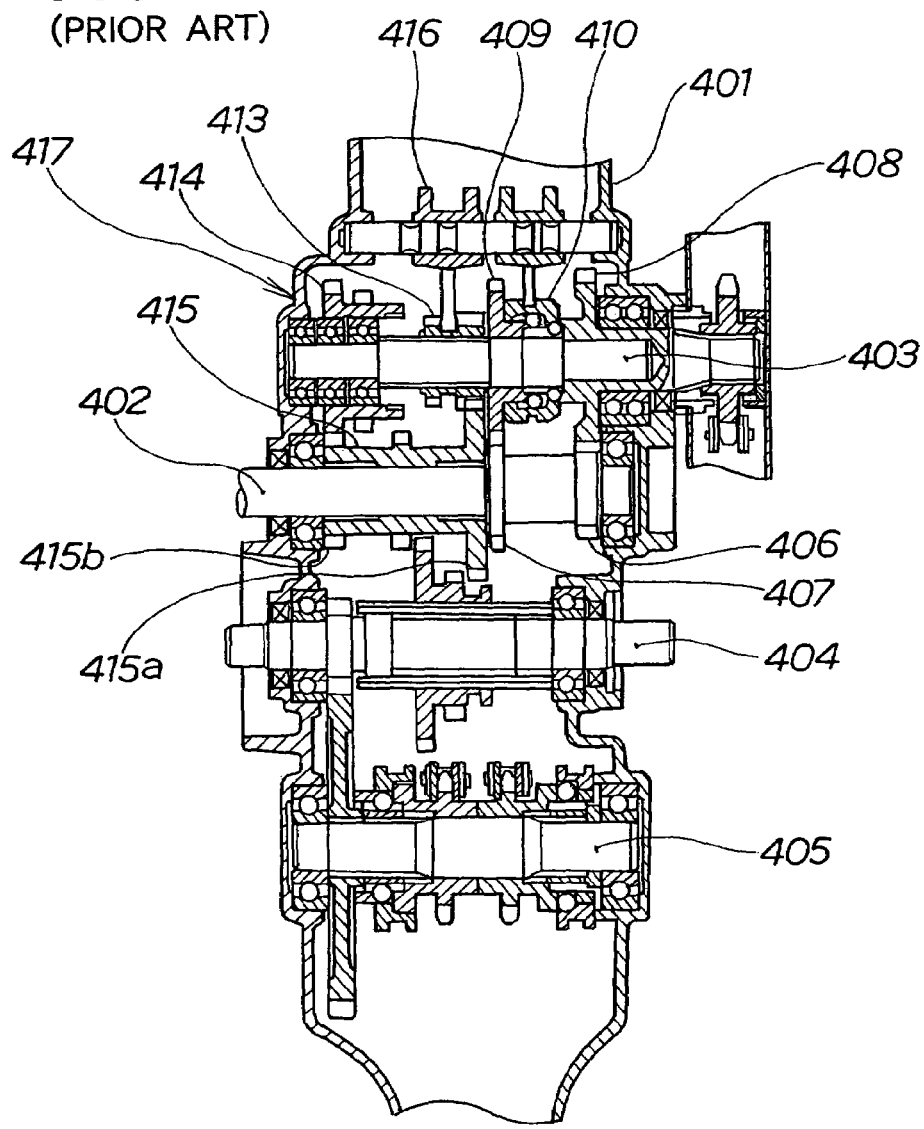
FIG. 29 is a cross-sectional view of a conventional transmission for working machines.
Figure 30:
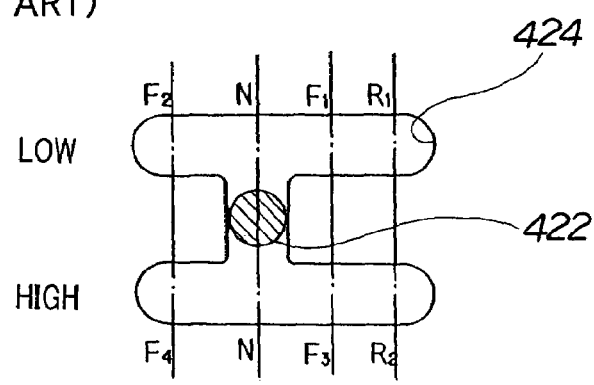
FIG. 30 is a diagram illustrating shift positions of a shift lever.

FIGS. 28A to 28C illustrate a clutch mechanism according to a fourth embodiment of the present invention. Components identical to those in the second embodiment shown in FIGS. 21 and 22 are given the same reference numerals and will not be described.

A clutch mechanism 220 in the embodiment shown in FIG. 28A consists of a blind hole (hole) 222 formed in a working shaft 221 orthogonally to the axis, a spring 141 disposed in the hole 222, a ball 142, three protrusions (engaging member) 224 protruding from the periphery of the working shaft 221, a first groove 126d formed in the inside peripheral surface of an input gear 224 engaging a coupling sleeve 127 (see FIG. 21), and three second grooves (recesses) 226 formed in the inside peripheral surface of the input gear 224 for engagement with the protrusions 223 of the working shaft 221.

Reference numeral 227 denotes clearances which allow the protrusions 223 to circumferentially move within the respective second grooves 226.

FIG. 28B illustrates the state in which teeth 127a of the coupling sleeve 127 move between teeth 68c of a first drive sprocket 68 as shown in FIG. 26C. Specifically, FIG. 28B illustrates the state in which the input gear 224 rotates counterclockwise with respect to the working shaft 221.

As shown in FIG. 28C, with the teeth 127a of the coupling sleeve 127 meshing with the teeth 68c of the first drive sprocket 68 as shown in FIG. 26E, the protrusions 223 abut on edges of the respective second grooves 226, transmitting power from the working shaft 221 to the input gear 224.

In the third embodiment shown in FIG. 27A, the hole 67f is formed in the working shaft 67, the shaft recess 67g is formed at an end of the hole 67f, and the key 211 is disposed in the shaft recess 67f The present invention is not limited thereto. It is also possible to movably dispose a cylindrical key within the hole 67f without providing the shaft recess 67g.

Obviously, various minor changes and modifications of the present invention are possible in the light of the above teaching. It is therefore to be understood that within the scope of the appended claims the invention may be practiced otherwise than as specifically described.

What is claimed is:

1. A transmission for varying power of a motor on a working transmission shaft and on a drive transmission shaft by operation of a shift lever for transmission to working devices and drive wheels, comprising:

on the working transmission shaft,
an input gear for receiving power of the motor;
a constant-mesh transmission mechanism for transmitting power of the input gear to the working devices or cutting off the power; and
a first gear row comprising a plurality of gears integrally mounted on the working transmission shaft; and
on the drive transmission shaft,
a second gear row comprising a plurality of gears rotatably mounted on the drive transmission shaft and meshing with the first gear row; and
a key-sliding transmission mechanism axially movably mounted for rotating a selected one of the gears and the drive transmission shaft together to transmit power to the drive wheels; and
shift members attached to the constant-mesh transmission mechanism and the keysliding transmission mechanism, respectively, the shift members being axially movable when engaged with the shift lever for effecting a shift operation.

2. A transmission as set forth in claim 1, wherein the constant-mesh transmission mechanism comprises:
the working transmission shaft;
an input gear mounted on the working transmission shaft;
a coupling sleeve having teeth in mesh with the input gear;
a drive sprocket having a gear for engaging with the coupling sleeve when the coupling sleeve axially moves; and
a clutch mechanism for allowing circumferential movement of teeth of the coupling sleeve for engaging or disengaging the teeth of the coupling sleeve with or from the gear of the drive sprocket.

3. A transmission as set forth in claim 2, wherein the teeth of the coupling sleeve and teeth of the gear have, at first ends thereof, tapers formed opposite to one another.

4. A transmission as set forth in claim 2, wherein the clutch mechanism comprises:
means defining a hole formed orthogonally to the axis of the working transmission shaft;
a protruding member provided to protrude from or retract into a first opening of the hole;
an engaging member protruding from a second opening of the hole, and engageable with an inside peripheral surface of the input gear so as to restrict rotation of the input gear with respect to the working transmission shaft; and
a biasing member interposed between the protruding member and the engaging member for pressing the protruding member and the engaging member outward of the hole.

5. A transmission as set forth in claim 4, wherein the input gear has, in an inside peripheral surface thereof, a first groove into and out of which the protruding member can move, and a second groove which allows the engaging member to move in a rotative direction of the working transmission shaft.

6. A transmission as set forth in claim 5, wherein the first groove includes a depression into which the protruding member moves, and an inclined surface formed circumferentially continuously from the depression.

* * * * *